(12) United States Patent
Shah

(10) Patent No.: US 9,870,591 B2
(45) Date of Patent: Jan. 16, 2018

(54) DISTRIBUTED ELECTRONIC DOCUMENT REVIEW IN A BLOCKCHAIN SYSTEM AND COMPUTERIZED SCORING BASED ON TEXTUAL AND VISUAL FEEDBACK

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

( * ) Notice: Subject to any disclaimer, the term of this patent is extended or adjusted under 35 U.S.C. 154(b) by 0 days.

(21) Appl. No.: 15/386,846

(22) Filed: Dec. 21, 2016

(65) Prior Publication Data

US 2017/0103472 A1   Apr. 13, 2017

Related U.S. Application Data

(63) Continuation-in-part of application No. 14/025,472, filed on Sep. 12, 2013, now abandoned.

(51) Int. Cl.
*G06Q 99/00* (2006.01)
*G06Q 50/00* (2012.01)
(Continued)

(52) U.S. Cl.
CPC .......... *G06Q 50/01* (2013.01); *G06F 17/2785* (2013.01); *G06K 9/00302* (2013.01);
(Continued)

(58) Field of Classification Search
CPC . H04L 9/0637; H04L 9/32; G06Q 10/063112; G06Q 30/018; G06Q 50/01; G06Q 30/0282; G06F 17/2785; G06F 3/013; G06F 3/0483; G06F 3/012; G06F 3/005; G06F 3/0481; G06F 2203/011; G06F 3/048; G06K 9/00302; G06K 9/00597; G06K 9/00617; G06K 9/00208; G06K 9/46; G06K 9/00228; G06K 9/00315; G06K 9/00362; G06K 9/00845; G06K 9/2081; G06N 5/02; A61B 3/113; A61B 5/165;
(Continued)

(56) References Cited

U.S. PATENT DOCUMENTS 5,706,452 A   1/1998   Ivanov
6,452,613 B1  9/2002   Lefebvre et al.
(Continued)

*Primary Examiner* — Gerardo Araque, Jr.
(74) *Attorney, Agent, or Firm* — Rahman LLC

(57) ABSTRACT

A blockchain configured system and a method for facilitating an expertise driven review and scoring of electronic documents in a crowdsourced environment. The system includes a server computer, a memory circuit and a processing circuit. The processing circuit is coupled to the memory circuit and includes or is coupled to a credentialing engine. The system further includes an expert scoring module. The system further includes a document reviewing and scoring engine coupled to the processing circuit. The document review and scoring module associates an aggregate score to the electronic document based on aggregation of the review ratings by crowdsourced experts and aggregate scores of each of the crowdsourced experts based on the set of attributes including one or more of the credentialed expertise, reputation of the expert, and the officiality.

16 Claims, 13 Drawing Sheets

(51) Int. Cl.
*H04L 9/06* (2006.01)
*H04L 9/32* (2006.01)
*G06Q 10/06* (2012.01)
*G06F 17/27* (2006.01)
*G06K 9/00* (2006.01)
*G06N 5/02* (2006.01)

(52) U.S. Cl.
CPC ........... *G06K 9/00597* (2013.01); *G06N 5/02* (2013.01); *G06Q 10/063112* (2013.01); *H04L 9/0637* (2013.01); *H04L 9/32* (2013.01)

(58) Field of Classification Search
CPC ......... A61B 3/0091; A61B 3/10; A61B 5/117; A61B 5/6821; A61B 3/0033; A61B 5/167; A61B 5/1176; G02B 27/0093
USPC .................................. 705/317, 319, 320, 347
See application file for complete search history.

(56) References Cited

U.S. PATENT DOCUMENTS

| | | | |
|---|---|---|---|
| 6,654,767 B2 | 11/2003 | McAnaney et al. | |
| 7,366,919 B1* | 4/2008 | Sobel | H04L 51/12 713/150 |
| 7,467,113 B2 | 12/2008 | McFarlin et al. | |
| 7,801,830 B1 | 9/2010 | Frank et al. | |
| 8,280,882 B2 | 10/2012 | Troy et al. | |
| 8,666,436 B2* | 3/2014 | Ellanti | H04M 1/72572 455/404.2 |
| 2001/0039505 A1 | 11/2001 | Cronin | |
| 2002/0161605 A1* | 10/2002 | Newman | G06F 19/328 705/2 |
| 2006/0129421 A1 | 6/2006 | Matveev | |
| 2006/0161353 A1* | 7/2006 | Mascarenhas | G06F 19/324 702/19 |
| 2006/0161456 A1* | 7/2006 | Baker | G06F 19/327 705/2 |
| 2007/0185732 A1* | 8/2007 | Hicks | G06F 19/324 705/2 |
| 2008/0040355 A1 | 2/2008 | Martinez et al. | |
| 2009/0027223 A1* | 1/2009 | Hill | G06Q 30/02 340/686.6 |
| 2009/0216589 A1 | 8/2009 | Ricci | |
| 2009/0276296 A1 | 11/2009 | Spriegel | |
| 2010/0010874 A1 | 1/2010 | Howard et al. | |
| 2010/0161507 A1* | 6/2010 | McKenzie, III | G01S 5/0027 705/347 |
| 2010/0161718 A1* | 6/2010 | Soelberg | G06F 17/30241 709/203 |
| 2010/0205025 A1 | 8/2010 | Johansen | |
| 2010/0266213 A1* | 10/2010 | Hill | A61B 5/16 382/218 |
| 2012/0002848 A1* | 1/2012 | Hill | A61B 5/164 382/118 |
| 2012/0158668 A1 | 6/2012 | Tu et al. | |
| 2012/0260209 A1* | 10/2012 | Stibel | G06Q 40/02 715/780 |
| 2014/0337948 A1* | 11/2014 | Hoyos | H04L 63/0861 726/7 |
| 2015/0213634 A1* | 7/2015 | Karmarkar | G06T 11/60 345/589 |
| 2015/0293897 A1* | 10/2015 | Myslinski | G06Q 10/06 707/755 |

* cited by examiner

DISTRIBUTED ELECTRONIC DOCUMENT REVIEW IN A BLOCKCHAIN SYSTEM AND COMPUTERIZED SCORING BASED ON TEXTUAL AND VISUAL FEEDBACK

CROSS-REFERENCE TO RELATED APPLICATIONS

This application is a continuation-in-part of U.S. patent application Ser. No. 14/025,472 filed on Sep. 12, 2013, the complete disclosure of which, in its entirety, is herein incorporated by reference.

BACKGROUND

Technical Field

The embodiments herein generally relate to electronic document validation, and more particularly to crowdsourced electronic document review and scoring utilizing textual as well as visual feedback from reviewers.

Description of the Related Art

Many organizations give financial aid and rewards such as grants, etc. for valuable ideas. However, in many cases, the organizations are not always sure about how to choose the most valuable ideas out of a set of innumerable ideas submitted for evaluation. Furthermore, many times the feedback may not be textual and therefore merely relying on textual feedback and review comments may not be sufficient for proper evaluation. This makes the evaluation process difficult and even less reliable by these organizations.

Therefore, there is a need for a method and system for electronic documents review and scoring based on different types of visual and textual reviews from verified and reliable sources.

SUMMARY

An embodiment herein provides a blockchain configured distributed architecture-based system in a communication network. The system includes a memory circuit, communicatively connected to the communication network, to store a plurality of digital profiles associated with a plurality of crowdsourced experts, and further to store a plurality of segmented digital profiles associated with each of the digital profiles, wherein the segmented digital profiles and digital profiles are created based on a plurality of sources distributed and electronically linked across the communication network. The system includes a credentialing engine to allow a plurality of crowdsourced respondents to respond to the segmented digital profiles associated with each of the plurality of experts and credential the plurality of experts and determine crowdsourced credentialed expertise, wherein the credentialing of each of the segmented digital profiles associated with an expert of the plurality of experts contribute to credentialing of a digital profile of the expert upon collation of the credentialed segmented digital profiles. The segmented digital profiles associated with the experts are credentialed from a plurality of respondents using a computerized crowdsourcing index. The crowdsourcing index is indicative of number of respondents credentialing an expert and dynamically increases with an increase in the number of respondents. The system includes an expert scoring module to determine a set of attributes for the experts. The set of attributes includes one or more of the crowdsourced credentialed expertise determined based on the credentialing of the segmented digital profiles of the experts by the respondents, reputation of the experts indicative of a trust of a relevant community on the experts, and officiality indicative of a position or a designation of the experts in a relevant job. Each of the attributes may be assigned varying computer-calculated weights. The expert scoring module further determines an aggregate score of an expert based on the one or more attributes in association with the assigned weights. The system further includes an electronic document scoring engine to receive and process review comments and document ratings for an electronic document by the crowdsourced experts. The crowdsourced experts may have an aggregate score greater than a defined threshold. The document scoring engine includes a natural language processing-based (NLP-based) analysis engine to process textual information-based reviews and comments generated as part of textual review of the electronic document by the crowdsourced experts. The document scoring engine includes a visual scoring engine for processing visual and non-textual feedback and reviews by the crowdsourced experts. The visual scoring engine includes an eye tracks processor controlled by a special purpose microprocessor to receive eye track inputs from respective eye tracking systems associated with computing devices of the crowdsourced experts and process the eye track inputs to associate a review score based on predefined eye track patterns. The visual scoring engine includes a micro expressions processor to receive data indicative of micro facial expressions extracted by respective micro expressions sensors associated with the computing devices of the crowdsourced experts. The micro expressions processor includes an image processing circuitry and an associated memory to interpret the micro facial expressions and compare them with predefined facial patterns to associate a review score based on the extracted micro facial expressions. The document scoring engine is further configured to associate an aggregate score to the electronic document based on aggregation of individual textual and visual review scores obtained by processing of the textual and the visual reviews by the crowdsourced experts who review the document. The document scoring engine is further configured to display, on a graphical user interface, an output indicative of an aggregate score of the document reviewed by the crowdsourced experts along with information about who reviewed and how many times reviewed the document. The system further includes an expert identity validation device to verify identities of the crowdsourced experts during or prior to review. The expert identity validation device includes a device patterns assessment device to receive and process device information extracted by respective agent devices associated with the computing devices of the crowdsourced experts and verify the extracted device information with predefined device information for the respective crowdsourced experts. The expert identity validation device includes a network patterns assessment device to receive and process network information extracted by the respective agent devices associated with the computing devices of the crowdsourced experts and verify the extracted network information with predefined network information of the respective crowdsourced experts. The expert identity validation device includes a geo-spatial mapping device to perform geo-tagging of the crowdsourced experts and the documents reviewed by the crowdsourced experts and compare the geo-tags with pre-stored geo-spatial information about the experts for processing validation. The geo-tagging is performed based on geo-spatial information received from a global positioning system (GPS)-based device. The expert identity validation device includes a facial expression validation device to receive and process facial expressions received from respective facial expression sensors associated with the computing devices of the crowdsourced experts and verify identity in accordance with respective predefined facial patterns of the crowdsourced experts. The facial expression validation device comprises a digital acquisition unit and multichannel amplifiers for pre-processing and amplification of signals transmitted by the facial expression sensors.

BRIEF DESCRIPTION OF THE DRAWINGS

The features of the disclosed embodiments may become apparent from the following detailed description taken in conjunction with the accompanying drawings showing illustrative embodiments herein, in which.

DETAILED DESCRIPTION

Figure 1:
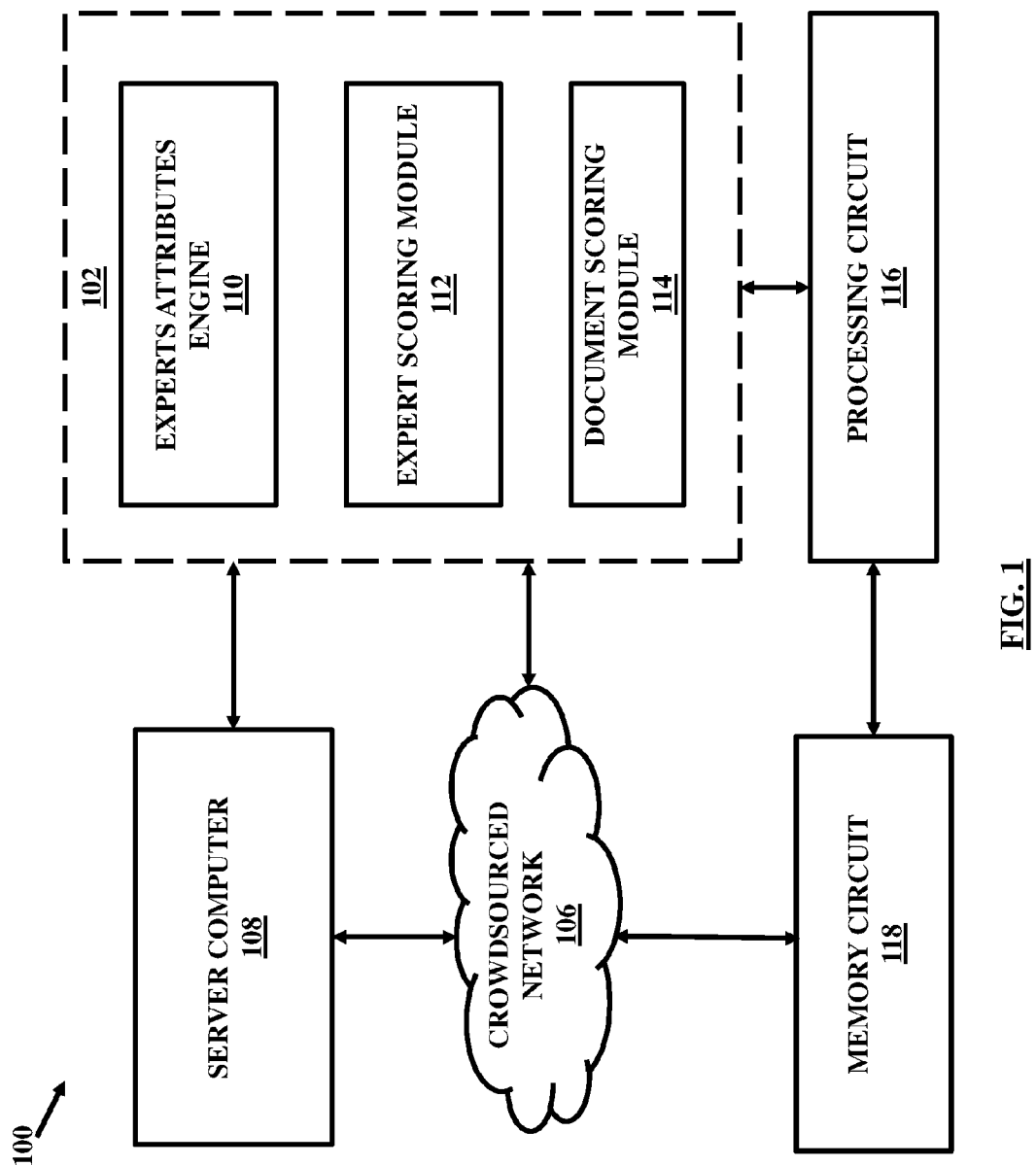
FIG. 1 illustrates generally, but not by way of limitation, an exemplary ecosystem in which various embodiments may operate.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, reference is made to the accompanying drawings that form a part hereof, and these are shown by way of illustrating specific embodiments herein that may be practiced. These embodiments, which are also referred to herein as "examples," are described in sufficient detail to enable those skilled in the art to practice the embodiments herein, and it is to be understood that the embodiments may be combined, or that other embodiments may be utilized and that structural, logical, and electrical changes may be made without departing from the scope of the embodiments herein.

In this document, the terms "a" or "an" are used, as is common in patent documents, to include one or more than one. In this document, the term "or" is used to refer to a "nonexclusive or" unless otherwise indicated.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be min aged by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 illustrates generally but not by the way of limitation, among other things, an exemplary ecosystem 100 in which various embodiments may operate. The ecosystem 100 may facilitate implementation of an expertise driven review and scoring system (also referred to as electronic document review and scoring system, EDRS) 102 of electronic documents in a crowdsourced network 106. The ecosystem 100 may include a server computer 108 connected to the electronic document review and scoring (EDRS) system 102. The EDRS system 102 may include an expert attributes assessment engine 110, an expert scoring module 112, and a document scoring module 114. The ecosystem 100 may further include a processing circuit 116 coupled to the EDRS system 102. The ecosystem 100 may further include a memory circuit 118 coupled to the processing circuit 116.

In an embodiment, the ecosystem 100 facilitates crowdsourced document review and scoring electronically by a plurality of crowdsourced experts or reviewers. The plurality of reviewers may be shortlisted based on a set of attributes in order to define assessment and evaluation criteria for the documents that results in associating a final score to the documents. The attributes may be defined and considered by the expert attributes engine 110. The attributes may include for example, crowdsourced credentialing, crowdsourcing index, officiality, reputation, and the like without limitations. The crowdsourced credentialing may be indicative of a degree of credentialing by a plurality of respondents, for example it may be indicative of a score obtained by the expert or reviewer on the basis of credentialing of the expert or an expert profile by a plurality of respondents. The crowdsourcing index may be indicative of the level of crowdsourcing that is the number of respondents credentialing the expert. In an embodiment, the effect of crowdsourcing index for an expert may bear a non-linear relationship of number of respondents credentialing an expert with a score of an expert thus obtained. For example, the relationship can be exponential. The officiality may be indicative of a position held by an expert at an organization. The reputation may be indicative of how much an organization or a community trusts an expert.

In examples, each of the attributes may be assigned specific weights. The process of assignment of weights to the attributes of the experts may depend on parameters for example, including without limitations, document type, document complexity, experts profiles, location and country of the expert, significance and objectives of review and scoring, and the like. In an example, the highest weight is assigned to officiality, then to credentialed expertise, then to reputation, and so on.

The expert scoring module 112 may facilitate cumulative scoring of an expert based on the defined attributes and assessment of the expert on each of the defined attributes as performed by the attributes engine 110. For example, the scoring module 112 may associate a score to an expert based on cumulative ranking of an expert for each of the attributes with a consideration of the respective weightages for the attributes. The expert scoring module 112 may include various sub modules or engines that may facilitate in evaluation of an expert's score based on each of the respective attributes. For example, as will be discussed later, the expert scoring module may include a credentialing system, reputation assessment engine, officiality engine, and the like.

The document scoring module 114 associates a score to the document based on an associated cumulative score based on respective scores of the crowdsourced reviewers/experts as determined by the expert scoring module 112. The cumulative score determined from the respective scores of the plurality of crowdsourced experts may factor in the effect of crowdsourcing by using the expert crowdsourcing index that may result in a non-linear effect on the final cumulative score. In an embodiment, the crowdsourcing index may be defined statistically for various number of experts reviewing a document. For example, within a range of 1-20, a crowdsourcing index 1 may be used as a multiplier for considering the crowdsourcing impact. For a range of 21-40, a crowdsourcing index of 1.2 may be used. For a range of 41-60, a crowdsourcing index of 1.5 may be used. In other examples, the crowdsourcing index may be determined dynamically with an increase in the effect with each added crowdsourced expert in the review process. In such cases, a mathematical relationship may be defined for determining the crowdsourcing index. The relationship may for example be an exponential increase in the value of the crowdsourcing index with an increase in the number of experts included in the review process.

The memory circuit 118 stores a plurality of common profiles associated with a plurality of crowdsourced experts. The memory circuit 118 further stores a plurality of federated profiles associated with each of the common profiles. In an example, the federated and common profiles are created based on a plurality of federated sources distributed across the crowdsourced network 106. The federated and common profiles will be discussed later.

The processing circuit 116 includes various processing components and is capable of performing processing tasks for aggregating profiles, federating common profiles, scoring and rating experts, assessing review of the documents, scoring of the documents and various other tasks as discussed throughout this document. In an example, the processing circuit 116 may include or be coupled to the expert attributes engine 110, expert scoring module 112 and document scoring module 114 for performing these and various other tasks.

In an example, the crowdsourced network may be a blockchain configured social integrity network so that the experts or reviewers or participants are connected with the blockchain configured social integrity network through distributed access points that serve as access to various systems and sub-systems of the ecosystem 100 in a distributed fashion for all participants to manage, share, edit, annotate and review documents in parallel within authorized access rules.

The blockchain configured ecosystem and associated components, also referred to as a "smart contract based distributed integrity network", may not require a centralized information exchange (IE) operator because all participants may have access to distributed ledgers to maintain a secure exchange without broken trusts. This allows disintermediation by removing human participants from a chain of the participants such as entities. Additionally, the documents for review are distributed across a plurality of storage locations in the blockchain accessible by the participants simultaneously and allowing to make updates and review them almost in real time. The blockchain configured ecosystem provides a secured, disintermediated and distributed framework to amplify and support integration of information across a range of uses and stakeholders defined by the entities. The blockchain configured digital ecosystem facilitates a secured and distributed framework for patient digital identities to allow access to body worn personally connected health devices, connected health devices at home and other facilities, storage devices and servers hosting the documents and the like, with the use of private and public keys secured through cryptography and thus protecting identity of a participant or reviewer by allowing a restricted access to a particular entity in accordance with dynamic rules and policies along with strong identity validation mechanisms using blockchain configured validation devices across the integrity network. The distributed nature of the blockchain configured digital ecosystem enables shared data which provides near real-time updates across a network accessible to all authorized entities without the need for a centralized authority or exchange. The blockchain configured ecosystem is discussed further in conjunction with subsequent figures.

Figure 2:
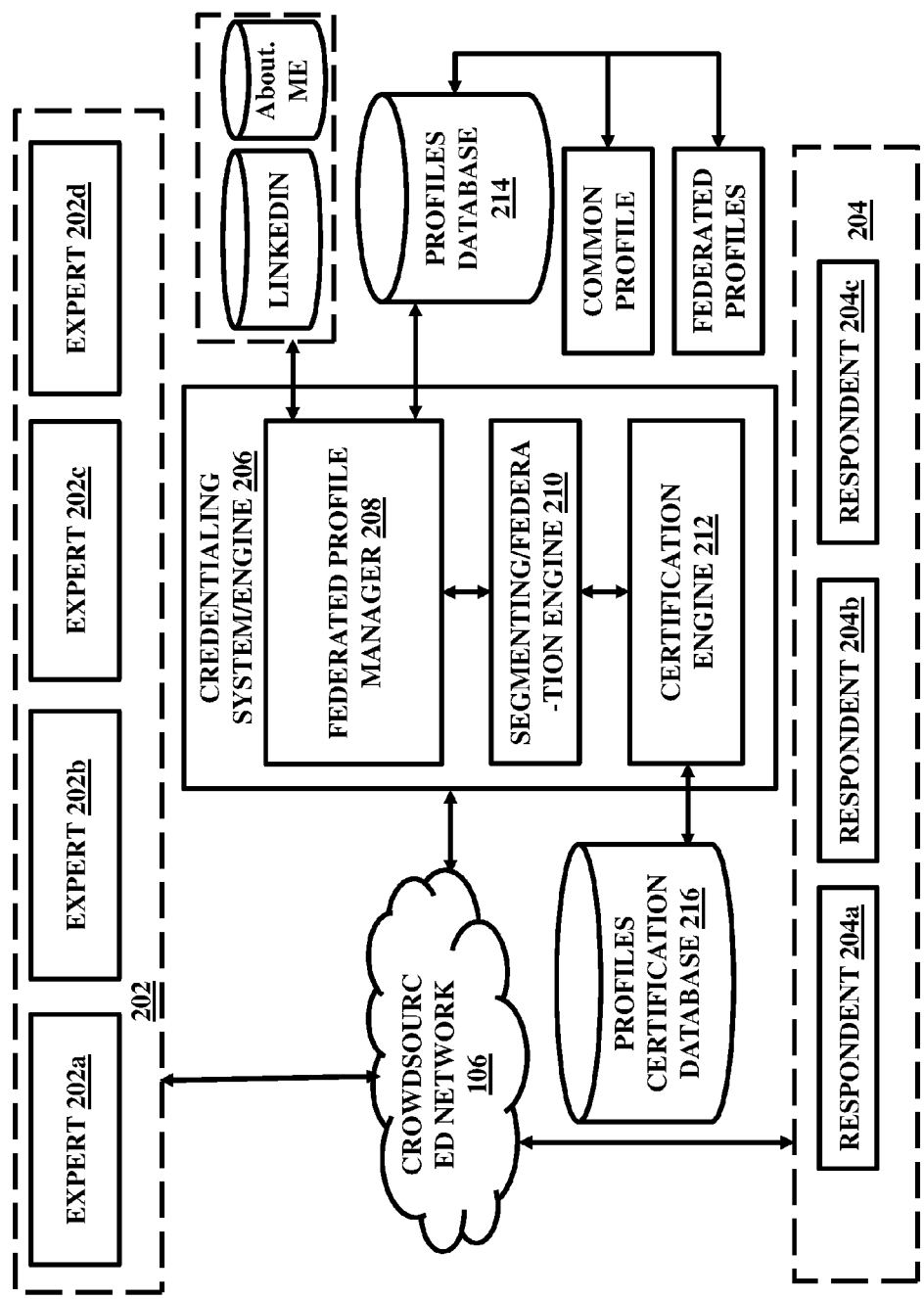
FIG. 2 illustrates an exemplary operating environment including a system for crowdsourced credentialing of experts.

FIG. 2, with reference to FIG. 1, illustrates generally, but not by the way of limitation, among other things, an exemplary operating environment for crowdsourced credentialing of the experts. The environment includes a plurality of experts 202a-202d (together referred to as 202) and a plurality of respondents 204a-204c (together referred to as 204) connected in a crowdsourced network 106. A credentialing system 206 is connected with the network 106 and is accessible by the experts 202 and the respondents 204 through the network 106 using for example a web-based interface or portal (not shown in FIG. 2).

The network 106 can employ a wireline or a wired communication channel or both. The wireless communications network may include for example, but not limited to, a digital cellular network, such as Global System for Mobile Telecommunications (GSM) network, Personal Communication System (PCS) network, or any other wireless communications network. The wire line communications network may include for example, but not limited to, a Public Switched Telephone Network (PSTN), proprietary local and long distance communications network, or any other wire line communications network. In addition, the network 106 may include for example, digital data networks, such as one or more local area networks (LANS), one or more wide area networks (WANS), or both LANS and WANS to allow interaction with the credentialing system 206. One or more networks may be included in the crowdsourced network 106 and may include both public networks such as the Internet, and private networks and may utilize any networking technology and protocol, such as Ethernet, Token Ring, Transmission Control Protocol/Internet Protocol (TCP/IP), or the like to allow interaction with the credentialing system 206. In an embodiment, the network 106 can be a blockchain configured social integrity network.

The experts 202 can include one or more of a physician, doctor, surgeon, healthcare expert, any other healthcare professional, or any other professional or expert from other industry such as energy, financial, transportation, logistics, and numerous other industries. The respondents 204 may include one or more of a physician, doctor, surgeon, healthcare expert, any other healthcare professional or healthcare organization such as a hospital, or any other professional or expert from other industry such as energy, financial, transportation, logistics, and numerous other industries, or any other person who may be interested in credentialing or accreditation process of the experts 202 or may be any person related to the experts 202 and who may provide a trusted response or comment on information about the experts 202 such as qualifications, work history and the like. A plurality of industry-related or other agencies such as hospitals, nursing centers, research institutes, financial companies, financial agencies, transportation agencies, energy related agencies, and others or hiring agencies or placement agencies may also access the system 206 to receive credentialing or verification services provided by the system 206 for the plurality of experts 202. In such embodiments, the system 206 may provide the services to such agencies based on credentialing of the information of the experts 202 obtained by the respondents 204.

The experts 202 and respondents 204 may be connected with, for example, any type of electronic data processing system or communication device or a client device connected to the communications network. Examples of such an electronic data processing system or client device may include personal computer systems, such as desktop or laptop computers, workstation computer systems, server computer systems, networks of computer systems, personal digital assistants (PDAs), wireless communications devices, portable electronic devices, smartphones, tablets, or any other electronic data processing system. The client devices or data processing systems can include hardware/software computing devices capable of computational tasks associated with profile creation, modification, verification, and presentation and the like as will be discussed later. These tasks can be performed through stand alone application, via Web browser graphical user interface (GUI), or via a Rich Internet Interface (RII). An embodiment herein may be implemented as computer software incorporated as part of an online social networking system. An embodiment herein may be implemented as distributed blockchain configured architecture. The credentialing system 206 can operate with the client device using a Windows, Macintosh, UNIX, Linux or other operating system equipped with a Web browser application, or other Web-enabled device capable of connecting to the crowdsourced network 106.

The credentialing system 206 provides a technical capability and a federation model such that profiles of the experts 202 may be created including details about the experts 202 and stored in the system 206. The details may include demographic information, personal information, educational background, work history or any other similar information. These profiles can be shared with the plurality of respondents 204 and experts 202 based on set standards and preferences and rules to implement a federated exchange capability wherein distinct portions of the profiles can be credentialed or accredited or verified and shared or exchanged with the experts 202 or respondents 204 in a federated manner. The system 206 further provides a credentialing and verification and accreditation capability such that profiles of each of the experts 202 may be credentialed or verified or accredited by any other expert or the respondents 204 for the use of the credentialed profiles by other experts 202 or an agency or organization such that the entire credentialed information or profiles available and credentialed through federated sources is accessible at a single location from the system 206 across distributed and connected access points in the blockchain configured architecture. In some embodiments, the system 206 further provides a capability to create a federated model of the profiles such that the federated segments or portions or profiles, as will be discussed later in detail, may be verified or credentialed distinctly by distinct federated respondents 204 in the crowdsourced network 106 such that the crowdsourcing increases the level of trust and authenticity and reliability of the credentialing and credentialed information due to cumulative effect of several federated verifications by the crowdsourced respondents 204 for the same segments of the profiles.

The credentialing system 206 as shown includes a federated profile manager 208, a segmenting or federation engine 210, and a certification engine 212 discussed below in detail.

The federated profile manager 208 is configured to receive information for profile creation from the plurality of experts 202. The federated profile manager 208 is responsible for maintaining the information thus received from the experts 202 and modify it as per updates from the experts 202. The federated profile manager 208 is configured to be linked to several sources of information that have the experts' presence such as for example their social networks including social networking websites, their educational institutions, work environments and the like. The federated profile manager 208 collects information from a plurality of sources for each of the experts 202 and collates the records and information in the form of a single common profile of each of the experts 202 that are associated with and communicate with the system 206. The profile manager 208, for example may collect information from federated sources such as Linkedin, Myspace, About.Me, education institutions, workstations, and the like. The common profile maintained by the system 206 may be viewable by the experts 202, respondents 204, relevant organizations, or any other persons or entities associated with or subscribed to the system 206. In some embodiments, the experts 202, respondents 204, relevant organizations, or any other persons or entities may access the distributed access points of the blockchain configured architecture for simultaneous near-real-time management of review process. In some embodiments, the federated profile manager 208 may automatically retrieve the profile information from the social networks. In some embodiments, the federated profile manager 208 may maintain information that is submitted by the experts 202 voluntarily.

The federated profile manager 208 may allow the experts 202 to maintain their profiles in the system 206 and protect the information in their profiles and their attention from inappropriate access, and makes their personal profiles connectable. The credentialing system 206 may further enable the profiles and information therein as searchable by the experts 202 and the respondents 204. In doing so, the experts 202 may use a web-based interface to access the user interface or portal of the system 206. The experts 202 can then create their profiles and update profile information using the user interface after an initial registration process. To register, the experts 202 may complete a registration form and enter a valid email address as a unique identifier, and a private password. The experts 202 may then set up their profiles and enter the information. The profile describes the user's background, experience, current and prior interests, capabilities, positions and titles, skills, values, projects, goals, employing organizations, working stations etc. The experts 202 can add contacts by entering contact and relationship information, and profile information for the contact, or a link to the contact's own profile on the system 206. The contact information may also be automatically uploaded or extracted from other sources such as an electronic address book, and authorized by the experts 202 for use in the credentialing system 206. The experts 202 may not want their address book integrated in the system 206. In this case, the experts' address book would be uploaded, but not integrated into the credentialing system 106 and possibly hidden from others. The profiles and contact information may be stored in either a central database or in distributed databases. For example, the system 206 may include or be coupled to a profiles database 214 that may store the information pertinent to the profiles of the experts 202.

In some embodiments, once an expert 202a joins the network 106 and subscribes with the credentialing system 206, the information included in the profiles is ready for credentialing, verification, accreditation, or any other such purpose. The entire profiles can thus be credentialed or verified by the system 206 from the plurality of crowd-sourced respondents 204 such that the crowdsourced respondents 204 can verify the profiles and credential them. The credentialing may also determine the profiles as accurate or inaccurate, trustable or non-trustable, authentic or unauthentic, fraud or genuine, etc.

In other embodiments, once the plurality of experts 202 join the network 106, the profiles are segmented into distinct portions or segments referred to as federated profiles by the federation or segmenting engine 210. The segmenting engine 210 is configured to receive the common profiles from the profile manager 208 and segment them into the federated portions or segments or profiles. In an example, the federation engine 210 fragments a common profile of an expert into a plurality of federated profiles based on commonalities in content of the federated profiles. The federated profiles are treated as distinct profiles for the purpose of credentialing separately by the crowdsourced respondents 204. For example, a common profile P of the professional expert 202a may include the following details:

Name: Amir A.
Age: 38 years
Sex: Male
Location: Texas, US
Education: B.S in Computer Science from Purdue University (1995)
  M.S. in Computer Science from Purdue University (1997)
  M.B.A. in Strategic Management (2005) from Kellogg School of Management
  PhD, Competitive Strategies (2011) from Kellogg School of Management
Certifications and Awards:
  Certification by Microsoft
  Certification of Proficiency in Networking Technologies
  Best Student award in 1994 by Purdue University
Work Experience:
  ABC: 1997-2003
  SDF: 2003-2005
  XCV: 2011-now For the purpose of simplicity of description, only some specific details are included as an example in the above profile, however several other details may also be included without limitations. The segmenting engine 210 may be configured to segment the profile into distinct federated profiles. For example, in some embodiments, the above common profile may be segmented by the segmenting engine 210 into several federated profiles as below:

Segment 1: First Name—Amir
Segment 2: Lat Name—A.
Segment 3: Middle Name—Null
Segment 4: Sex—Male
Segment 5: Location (Area)—Texas
Segment 6: Location (Country)—US
Segment 7: Education—B.S.
Segment 8: B.S. in year—1995
Segment 9: Education—M.S.
Segment 10: M.S. in year—1997
Segment 11: B.S. from University/Institute—Purdue University
Segment 12: M.S. from University/Institute—Purdue University
Segment 13: Education—M.B.A
Segment 14: MBA from university/institute—Kellogg School of Management
Segment 15: MBA in year—2005
Segment 16: MBA specialization—Strategic Management
Segment 17: Education—PhD
Segment 18: PhD from University/Institute—Kellogg School of Management
Segment 19: PhD in year—2011
Segment 20: PhD work—Competitive Strategies
Segment 21: Certification—by Microsoft Segment 22: Certification of proficiency
Segment 23: Certificate of Proficiency in stream—Networking Technologies
Segment 24: Award: Best Student
Segment 25: Award of Best Student received in year—1994
Segment 26: Awarded by—Purdue University
Segment 27: Work Experience—ABC
Segment 28: ABC tenure begins in—1997
Segment 29: ABC tenure ends in—2003
Segment 30: Work Experience—SDF
Segment 31: SDF tenure begins in—2003
Segment 32: SDF tenure ends in—2005
Segment 33: Work Experience—XCV
Segment 34: XCV tenure begins in—2011
Segment 35: XCV tenure ends in—continuing now As discussed above, a single common profile is segmented by the segmenting engine 210 in thirty-five discrete federated profiles that are distinct in one or the other ways. In accordance with various embodiments, the segmenting engine 210 can be configured to segment a common profile in as many discrete federated profiles as possible. Therefore, the entire information contained in a common profile is segmented into several discrete federated profiles. For example, the above discussed common profile is converted into thirty-five such federated profiles. Upon segmenting, the federated profiles may be communicated to the federated profile manager 208. Thus, the federated profile manager 208 stores common profiles as well as federated profiles associated with the professionals or experts 202 in the profiles database 214.

The segmenting engine 210 may include hardware and software components capable of computational tasks associated with segmenting of the common profiles into the federated profiles. Once segmented by the segmenting engine 210, the federated profile manager 208 may further classify the federated profiles or segments into groups of federated profiles for the same experts 202 so that the groups may include similar federated profiles based on certain parameters. For example, the work experience related federated profiles segments 27, 30, and 33 that define different companies where an expert was employed and is employed may be grouped together do define another type of profile referred to herein as a sub-profile. Similarly, various other groups may be formed to create various other sub-profiles based on several possible combinations of the federated profiles or segments or profile portions. The credentialing system 206 thus can facilitate maintaining of the common profiles, sub-profiles and the federated profiles for the same experts thus providing a three level profile management facility. It must be appreciated that this document uses the term portion, segment and federated profile interchangeably without limitations.

The credentialing system 206 further includes the certification engine 212 coupled to the segmentation engine 210 and the federated profile manager 208. The certification engine 212 is configured to allow the plurality of crowdsourced respondents 204 to respond to the segmented and classified profiles associated with the plurality of experts 202 and credential them. The credentialing of each of the segmented portions or federated profiles associated with an expert 202a of the plurality of experts 202 contributes to credentialing of the entire profile of the expert 202a upon collation of the credentialed portions. For example, the exemplary profile as discussed above includes thirty-five segments. The credentialing of each of the segments influences overall credentialing of the entire common profile.

Therefore, if all the thirty-five segments are credentialed and verified as correct by one or more respondents 204, a trust may be associated about the profile information and the information may be considered as true or authentic. As more and more persons or respondents from the plurality of crowdsourced respondents 204 verify the information in the federated profiles, the trust associated with the respective segments increases. Further, the crowdsourcing index may be associated to indicate and factor in the level of crowdsourcing. In an example, the crowdsourcing index may bear a non-linear such as exponential relationship with the number of respondents crowdsourcing an expert. Therefore, the degree of reliability and trust may increase non-linearly as more and more respondents credential an expert. Therefore, the crowdsourcing may facilitate in credentialing more accurately and with a higher reliability of the federated profiles than that credentialed from only a few sources. Further, the overall accuracy of the common profile may be determined based on a cumulative effect of accuracy of each of the federated profiles. For example, if the first ten of the segments from the above common profile are verified and the remaining twenty-five segments are not verified due to no response from the respondents 204, this may not yield an overall high accuracy of the common profile and may still require credentialing and verification of the remaining segments but may be considered as acceptable to a certain extent. On the contrary, if the remaining twenty-five segments are rejected and verified as wrong information by the respondents 204, the overall common profile may be considered as inaccurate. Further, since the discrete federated profiles associated with an expert 202a are credentialed from the plurality of crowdsourced respondents 204, there may be a high level of accuracy in the credentialing and the credentialing may be considered as highly authentic and reliable.

The certification engine 212 is adapted certify the stored federated profiles relating to the experts 202 such as physicians, engineers, or other industry experts who must have their credentials verified for use by various agencies or for use in for example by the experts 202 themselves during filling and submission of forms to various companies for such as hiring purposes or other purposes or document review processes. The credentialing information related to a particular expert 202a desiring to use the embodiments herein is initially input in the form of a common profile and then segmented and credentialed separately for each of the federated profiles through the crowdsourced network of the plurality of respondents 204. Therefore, the credentialing information, when credentialed for each of the federated profiles, is more accurate and valid and acceptable than the common profile verified in entirety where special attention may not be paid to every record of the common profile. Secondly, the degree of acceptance of credentialing information is much higher through crowdsourcing than for a single verification by a single source. Therefore, according to some embodiments herein, the number of sources credentialing a particular federated profile may be associated with each of the segments to indicate a level of accuracy of the credentialing information. For example, if a federated profile is credentialed and verified by eighteen sources in the network, it may be considered as highly acceptable. Also, the relevant information about credentialing such as who credentialed, when credentialed may also be associated with each credentialing of each of the segments so that an authenticity may be judged by associating an overall impact of the federated profiles' credentialing, number of times credentialed, and trust factor about the source who verified and relevance about the time when verified. Therefore, in such embodiments, a multi-scaled and cumulative score may be determined and multi-scaled and cumulative credentialing may be done based on the multi-scaled cumulative score determined. Further, since a single federated profile may be verified by the plurality of crowdsourced respondents 204, therefore the credentialing system 206 may determine an extent of inconsistency between several credentialing by several different respondents 204 for the same federated profile. In this manner, the system 206 may be configured to determine an index of inconsistency depending on distribution of differences across several credentialing by the several respondents 204. The credentialing system 206 may be configured to generate a map indicating extent and coverage of inconsistencies among the several responses and credentialing for the same federated profiles. The map together with the inconsistency index may facilitate in determination of a level of trust in the overall credentialing of the same federated profile. This process may be repeated for each of the federated profiles for a common profile of an expert such as 202a and thus may determine an overall index of inconsistency and overall distribution map and overall trust factor for the common profile.

In some embodiments, various organizations or agencies such as for example document reviewing and inventions or ideas evaluation agencies may use the credentialing information, index of inconsistency, and distribution map as obtained from the system 206. The credentialing information may include information such as who verified or credentialed, when verified, how many times verified, how many different and unique verifications, trust factor associated with each verification based on such as a respondent's relationship with an expert such as 202a or any other factor, and other similar information. In some embodiments, the credentialing information may be used by the experts 202 themselves so that they can use the credentialing information as a proof of expertise and submit it along with various application forms to companies, hiring agencies, firms, healthcare centers, hospitals or any other agency or organization belonging to various energy sectors. Various types of information such as demographic, personal work history, educational information, affiliation with hospitals or institutes etc. can be credentialed. The credentialed information may include such as person's name, address, practice specialties, appointment status, associations, credentials (including educational background, internships, and residency programs), state licensing information, malpractice liability insurance information, and personal and professional references. This entire information may be stored in the profiles database 214 maintained by the federated profile manager 208.

In some embodiments, the certification engine 212 may be coupled to or may include a profiles certification database 216. The profiles certification database 216 may include the credentialing information as discussed above. In some embodiments, the profiles certification database 216 may be included within the profiles database 214 only, and thus a single database may include memory spaces for storing the profiles information and the certification or credentialing information.

In some embodiments, in creating the common profile and uploading profile information in the database, a separate application form may be completed for each professional participating in and using the benefits of the system 206. The information in the application form may be preferably provided to the profiles database 214, which may store experts' profile information using the system 206. The information may be stored as a series of logically organized experts' profiles and may be extracted as necessary during segmentation by the segmenting engine 210. In some embodiments, the process of segmenting may be initiated by the segmenting engine 210 automatically as and when new information is added or updated. In case the past information is modified, the segmentation task is performed again to update the federated profiles and perform credentialing of the updated federated profiles once again. In such cases, only relevant credentialing may be needed to be revised depending on the updates instead of rejecting the entire past federated profiles and credentialing information associated with them.

Figure 3:
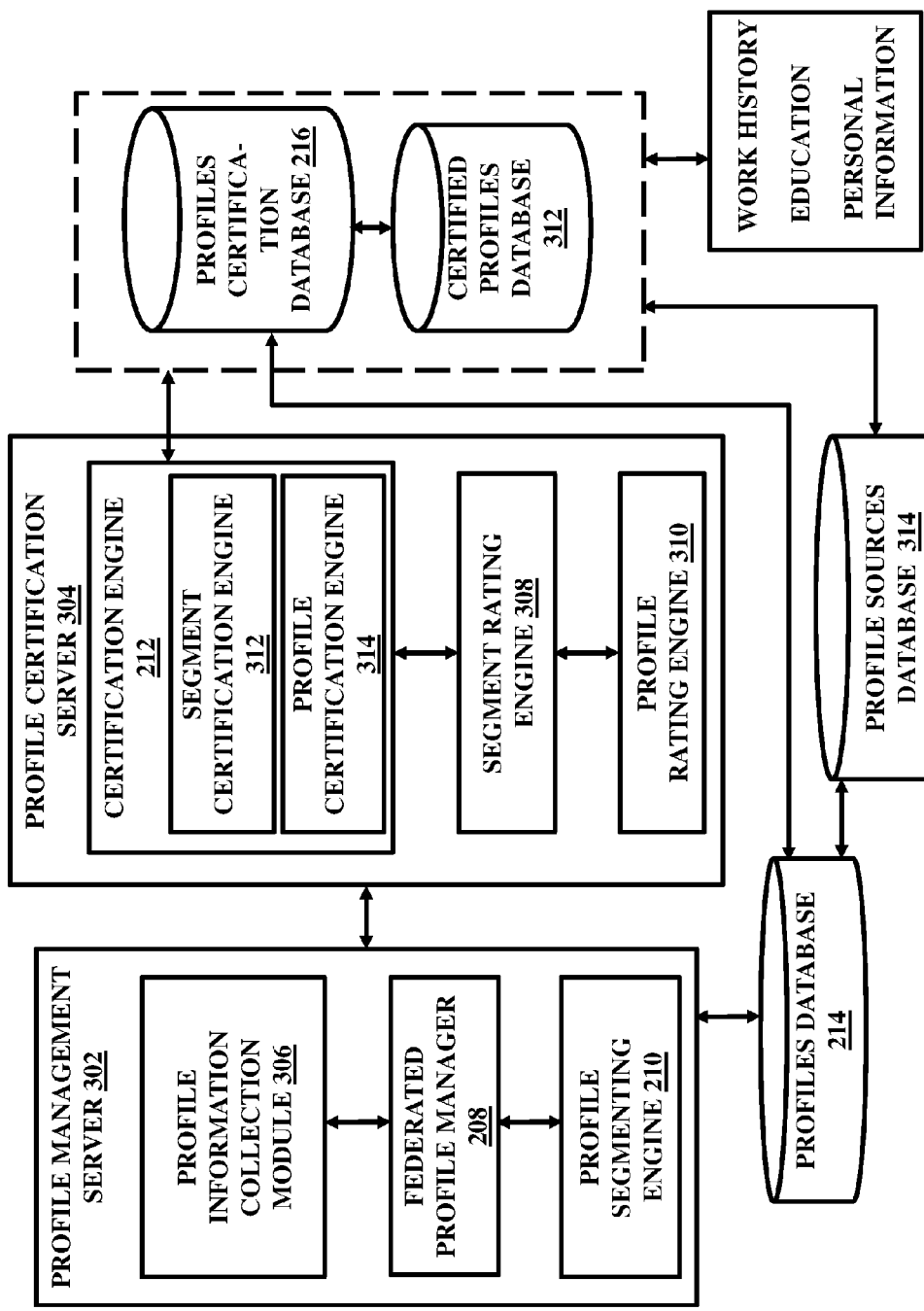
FIG. 3 illustrates a credentialing system, in accordance with an embodiment.

FIG. 3, with reference to FIGS. 1 and 2, illustrates the credentialing system 206 in accordance with an embodiment. As shown, the system 206 may include a profile management server 302 and a profile certification server 304. The profile management server 302 includes a profile information collection module 306, the federated profile manager 208, and the profile segmenting engine 210.

The profile information collection module 306 may be configured to generate information about the plurality of experts 202. In some embodiments, the profile information collection module 306 can be disposed separately from the federated profile manager 208; while in other embodiments it can be included in or coupled to the federated profile manager 208. The profile information pertaining to profiles of the plurality of experts 202 can be generated by distributing application forms through a graphical user interface accessible by the experts 202 such that the experts 202 can fill the forms and submit with the system 206. The information can be transformed in the form of profiles by the federated profile manager 208. The segmenting engine 210 may then use the profiles information and perform the task of segmenting of the common profiles into the federated profiles associated with each of the experts 202.

The profile certification server 304 may be communicatively coupled to or included in the profile management server 302. The profile certification server 304 may include the certification engine 212, a segment rating engine 308, and a profile rating engine 310. The certification engine 212 may further include a segment certification engine 312 and a profile certification engine 314.

The segment certification engine 312 may be configured to facilitate credentialing or certification of the federated profiles associated with the common profiles associated with each of the experts 202. The segment certification engine 312 is configured to allow the plurality of crowdsourced respondents 204 to respond to the federated profiles associated with the common profiles of the plurality of experts 202 and credential them. The credentialing of each of the federated profiles associated with the common profiles of each of the experts 202 contributes to credentialing of the entire common profile of the experts 202 upon collation of the credentialed federated profiles. As more and more persons or respondents from the plurality of crowdsourced respondents 204 verify the information in the federated profiles, the trust associated with credentialing of the respective federated profiles increases. Therefore, the crowdsourcing may allow credentialing of the federated profiles to a higher degree of accuracy and reliability. Since the discrete federated profiles associated with an expert 202 are credentialed from the plurality of crowdsourced respondents 204, the credentialing defines a high level of accuracy and may be considered as highly authentic and reliable and acceptable by third parties or agencies. Moreover, the crowdsourcing index may be associated to factor in the effect of crowdsourced credentialing as discussed above.

The segment certification engine 312 is adapted to certify the stored federated profiles relating to the experts 202 who must have their credentials verified. According to some embodiments herein, the number of sources credentialing a particular federated profile may be associated with each of the segments to indicate a level of accuracy of the credentialing information. Also, the relevant information about credentialing such as who credentialed, when credentialed may also be associated with each credentialing of each of the federated profiles so that an authenticity may be judged by associating an overall impact of the federated profiles' credentialing, number of times credentialed, and trust factor about the source who verified and relevance about the source and time when verified. Therefore, in such embodiments, a multi-scaled and cumulative score may be determined and multi-scaled and cumulative credentialing may be done based on the multi-scaled cumulative score determined.

The information pertaining to credentialing of the individual federated profiles of a particular common profile associated with an expert such as 202a may influence an overall credentialing of the common profile. For example, individual credentialing of the federated segments may contribute to the overall common profile credentialing such that the credentialing of the overall common profile may depend on each of the federated profiles' credentialing with a weightage attached to each credentialing of the federated profiles. The collated contribution considering weightage effect of each credentialing finally decides credentialing of the overall common profile. The task of credentialing the overall common profile associated with an expert such as 202a may be performed by the profile certification engine 314. For example, the profile certification engine 314 may facilitate credentialing of the profile in its entirety based on the collated effect of credentialing of the federated profiles associated with the common profile of an expert such as 202a. The profile certification engine 314 may receive information pertinent to credentialing of each of the federated profiles associated with a common profile and then associate the defined weightages to each of the federated profiles and perform cumulative credentialing of the common profile. In an embodiment, the weightages may be determined based on parameters defined by a service provider who operates the system 206. In such embodiments, the weightages may be defined based on for example past experiences or current understanding about significance of accuracy of credentialing for different segments. For example, the accuracy of credentialing may be more important for work history than information pertinent to hobbies of a professional when applying for a job. Therefore, the objective use of the credentialing information may influence determination of the weightages and hence the overall credentialing. Therefore, a score indicative of the influence of the objective may be associated for the credentialing purposes in some embodiments. In some embodiments, the weightages may be defined by an agency requiring the credentialing information. Therefore, in such cases, the profile certification engine 314 may perform credentialing of the common profile in a custom defined manner and also in association with the objective score.

The profile certification server 304 further includes the segment rating engine 308. The segment rating engine 308 is configured to associate a rating to each of the credentialed federated profiles based on credentialing from the crowdsourced plurality of respondents 204 and depending on a level of accuracy and trust associated with the credentialing of the federated profiles. The rating may depend on who credentialed a federated profile, when was a profile credentialed, how many times a profile was credentialed, how many unique credentials are done, relevance of respondents 204 credentialing the federated profile, relationship of the respondents 204 with the expert such as 202a of the credentialed federated profile, and the like.

The profile certification server 304 may further include the profile rating engine 310. The profile rating engine 310 is configured to associate a rating to an entire profile based on credentialing of each of the federated profiles and ratings associated with each of the federated profiles as determined by the segment rating engine 208 cumulatively.

The profile management server 302 is coupled to the profiles database 214 to store information pertinent to the profiles of the plurality of experts 202. The profiles database 214 may be coupled to the federated profile manager 208 such that the federated profile manager 208 maintains the information stored in the profiles database 214.

The profile certification server 304 may be coupled to the profiles certification database 216. The profiles certification database 216 is configured to store information pertinent to credentialing such as certification status of the federated or common profiles associated with the plurality of experts 202. For example, the certification status may include one or more of verified segment, verified profile, pending verification, verification in progress, segment rejected as incorrect, profile rejected as incorrect and the like. The profiles certification database 216 may be coupled to the profiles database 214 and the certification engine 212.

The profile certification server 304 may be coupled to the certified profiles database 312. The certified profiles database 312 may further be coupled to the profiles certification database 216. The certified profiles database 216 may be configured to store profiles that have been verified by the certification engine 212. An entity or agency may be allowed a direct access to the certified profiles database 316 based on preferences and rules defined for the entity or the agency. The entity may be one of a medical entity such as a hospital, nursing center, doctor, physician, healthcare unit, and government healthcare department, or an entity belonging to other industry such as financial sector, energy, transportation and the like or any other third party or agency. The certified profile or credential database 316 may further store information pertinent to one or more of work history, education, and personal demographics, affiliations to hospitals or other institutes etc. of one or more experts 202 corresponding to one or more of verified profiles.

The profiles database 214, profiles certification database 216, and the certified profiles database 312 may be coupled to a profiles sources database 314. The profile sources database 314 may include information about a plurality of sources in the crowdsourced network 106 that are linked to the federated profiles associated with the plurality of the experts 202, and information about a plurality of sources who responds to the federated profiles for credentialing. For example, in the crowdsourced network 106, the plurality of respondents 204 may credential the federated profiles and thus the profiles sources database 314 may store their details, their names, other information, their relevance and relationship with the experts 202 associated with the federated profiles they credential and time of credentialing, and location of original credentialing or any other such information pertinent to the credentialing sources etc.

In an example, the profiles database 214, profiles certification database 216, and the certified profiles database 312 may be blockchain configured so as to allow access by the entities (experts 202 and respondents 204) or any other agency and associated computing systems through the distributed plurality of access points simultaneously and reflect or view reviews or any changes during review process in near real-time.

Figure 4:
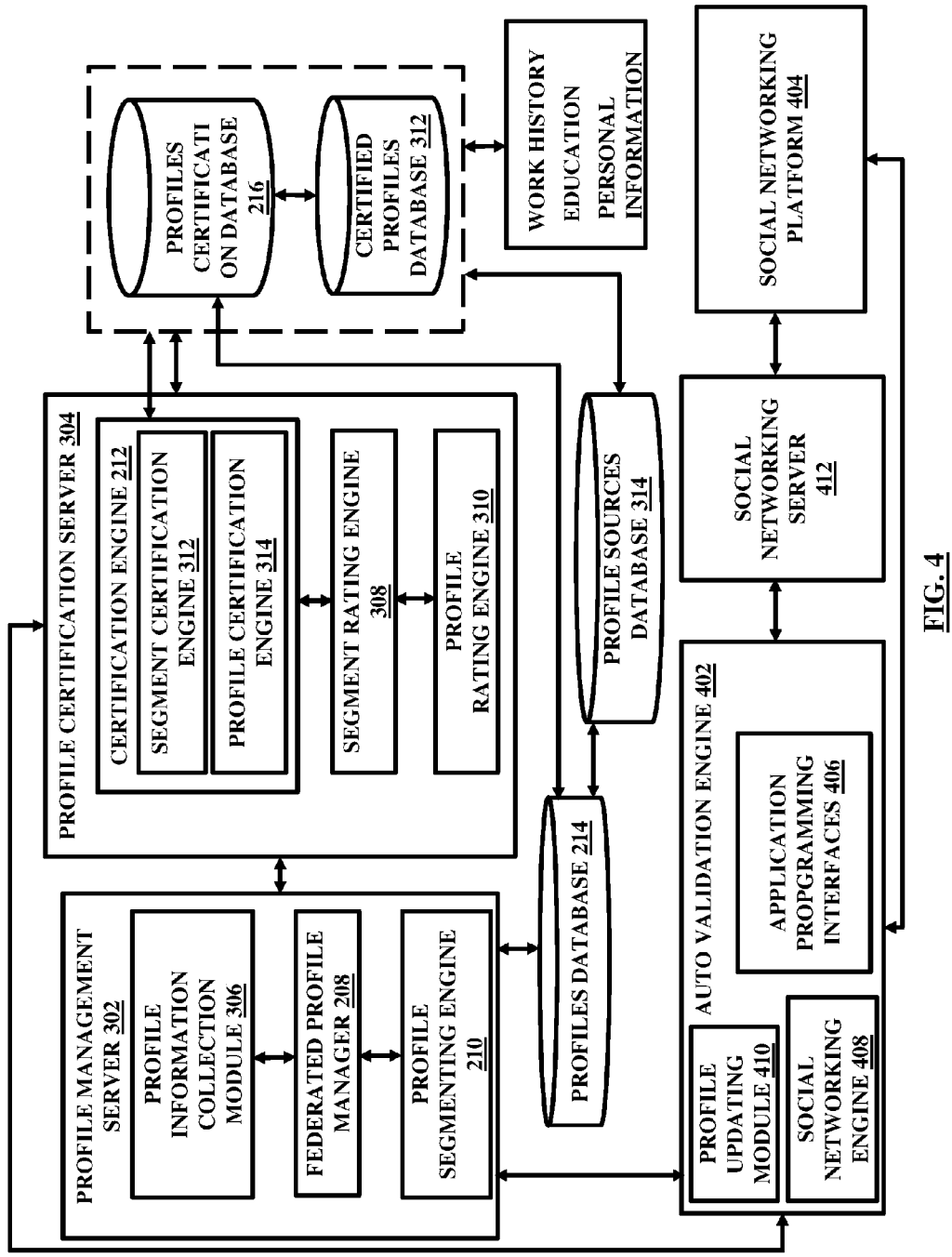
FIG. 4 illustrates another embodiment of the credentialing system of FIG. 3.

FIG. 4, with reference to FIGS. 1 through 3, illustrates another embodiment of the credentialing system 206. The credentialing system 206 may include the profile management server 302 and the profile certification server 304 as discussed above. The system 206 may further include an auto-validation engine 402 coupled to the profile certification server 304 and the profile management server 302. The auto-validation engine 402 is further communicatively linked to a social networking platform 404. The social network platform 404 hosts information related to one or more of the experts 202. For example, the social networking platform 404 may host social profiles of the experts 202 where the experts 202 may store and update their personal, professional or other such details or may communicate in a social network with friends, relatives, family members, or other such networking contacts.

The auto-validation engine 402 is configured to further certify the credentialing of the federated profiles that is performed by the certification engine 212. The second level certification by the auto-validation engine 404 is performed by using the information about the one or more experts 202 from the social networking platform 404. For example, an expert such as 202a may be associated with a social networking website such as a Linkedin or Facebook. The expert 202a may maintain a separate profile for each such social networking website. The credentialing of the expert 202a for specific federated profiles may thus be further verified by using the information obtained from the social networking profiles.

In an embodiment, the credentialing by the respondents 204 is used to associate a rating and define a level of trust for the federated profiles and the common profiles. The further verification based on the information obtained from the social profiles of the experts 202 may further associate another rating or score to the federated profiles such that a level of trust about the plurality of experts 202 and their federated and common profiles may be determined based on a cumulative effect of credentialing and the auto validation of the federated profiles and the common profiles. The cumulative score determined based on individual scores from the auto validation and the credentialing by the respondents 204 may define a net rating and overall credentialing of the federated profiles and the common profiles. The federated profiles and the common profiles in association with the information pertinent to the credentialing and the auto-validation may thus be used or accessed by agencies or organizations or various entities or agencies to determine a level of trust in the credentialed information; i.e., the credentialed federated and thus common profiles.

The auto-validation engine 402 may include application programming interfaces (APIs) 406, a social networking engine 408, and a profile updating module 410.

The social networking engine 408 is coupled to one or more social networking server 412. The social network engine 408, which may be controlled by the social network server 412, is configured to process a request of the credentialing system 206 for retrieving social profiles information and verifying the credentialed federated and common profiles by using the information obtained from the social profiles. The social networking engine 408 is communicatively coupled to the social networking platform 404 through the social network server 412 to allow interfacing of the system 206 with the social networking service or platform 404. The social network server 412 may provide a programmatic web interface via the network 106 for accessing the social profiles by the system 206. In some embodiments, the social networking server 412 may store social data related to the one or more experts 202 obtained from the social profiles hosted by the social networking platform 404 to integrate the social data with the credentialed federated profiles for further verification or updating of the credentialing by auto-validation.

The social networking engine 408 may utilize the APIs 406 etc. to allow verification of the federated segments associated with the plurality of experts 202 based on the information contained in the social profiles of each of the experts 202 maintained by the social networking platform 404. In an embodiment, the social profiles maintained by the social networking platform 404 are distinct from the federated or common profiles of the professionals or experts 202 maintained by the federated profile manager 208. The APIs 406 further allow the auto-validation to determine an extent of mapping between the information contained in the two distinct profiles maintained by the federated profile manager 208 and the social networking platform 404. The social networking platform 404 may include several social networking sources. The social networking sources may include without limitations social networking websites, educational institutions, employers' databases etc. For example, an expert such as 202a may be associated with one or more of such or other similar social networking sources in the social networking platform 404. The APIs 406 are adapted to link each of the federated profiles to one or more such distinct sources of the social networking platform 404 such that a unique identifier is maintained that associate a distinct source of the social networking platform 404 to a federated profile.

The profile updating module 410 is configured to update or modify the profiles based on further verification of the federated profiles after auto-validation. For example, even after the credentialing by the respondents 204, the auto-validation may demand to modify the federated profiles which the profiles updating module 410 may do, in some cases after seeking permissions from the experts 202. The profile updating module 410 may be communicatively coupled to the profile management server 302 so as the federated profile manager 208 to store and maintain the modified federated and common profiles.

In an embodiment, the social networking platform 404 may be defined as a network with an arbitrary large number of networked computers accessing the social network 404 through registered social profiles. The social network 404 facilitates posting and sharing online profiles, data, clinical reviews simultaneously viewable by each of the arbitrary large number of computers including such as a clinical provider computer, reviewer's computer, third party's computer, respondent's computer, expert's computer, patient's computer, and the like.

The social networking platform 404 may include for example one or more social networking sources. The sources may be such as social networking websites, educational institutions, employers' databases or portals or platforms, hiring agencies' portals, and other such sources of creating a socially aware network. Some examples of social networking websites are without limitations Linkedin, MySpace, About Me, etc.

A service provider may deploy the credentialing system 206 and provide credentialing services to various organizations or agencies that can be a hiring agency, recruitment and selection or placement department or agency, document or inventions or ideas reviewing and scoring and evaluation agencies, an entity such as a hospital or a medical institute, research organization education institute, transportation company, energy department, financial institution and the like. The organizations such as document or inventions or ideas reviewing and scoring and evaluation organizations can deploy these systems in-house for evaluation of ideas or documents. An expert such as 202a may submit his profile details to the service provider that may be stored in the system 206. The service provider may obtain verifications and credentialing of the profile details or other information provided by the expert 202a and may store the information pertinent to the credentialing of the information of the expert 202a. The service provider may utilize a crowdsourced network 106 of people including such as the respondent 204a or authorizer 204a who may be any other expert or any of the respondents 204. The service provider, expert 202a and the respondent or authorizer 204a may connect with one another over the network 106 through a web-based graphical user interface that may serve as a portal for interconnection. The portal or interface may provide a subscription section through which the entities such as the expert 202a, agency, or the respondent/authorizer 204a may associate them with the credentialing system 206. Different sections may be provided for each to the expert 202a, respondent 204a, and agency. Upon subscription, the expert 202a may be allowed to submit his details to the system 206 and/or create a profile.

The profile information may be publicly visible in some embodiments or may be made visible to the specific respondent 204a by the service provider for credentialing purposes and receiving responses from the respondent 204a about the expert 202a. The profile information may be credentialed and verified in entirety or in segments as discussed above and may be stored in the system 206. The agency may thus know accreditation or credentialing about the expert 202a by visiting the portal through a separate section defined for such agencies. Therefore, through the web-based portal or interface, the agency may be facilitated to collect credentialing information and the authenticity about the expert's profiles and other information by visiting the single centralized system 206 and may not need to verify the details of the profiles from several sources such as workplaces, educational institutes etc. Further, since the server 108 performs credentialing from a crowdsourced network of experts 202, therefore, the accuracy of the credentialing and authenticity and reliability of the profiles' information may be higher and the agency can rely on the information with a greater degree of trust and reliability. Further, since the profile information is segmented into the federated profiles, therefore, the credentialing may be more specific to each of the information details contained in the federated profiles and the agency may easily know which information is verified and which is not or which may be pending for verification. In some embodiments, the agency may also know who verified a particular federated profile, when was a particular federated profile verified, and how many unique verifications are done for a specific federated profile. Therefore, with all these features provided through the present system 206, the credentialing may be made easier, quicker, trustable, reliable, accurate, and manageable.

Figure 5:
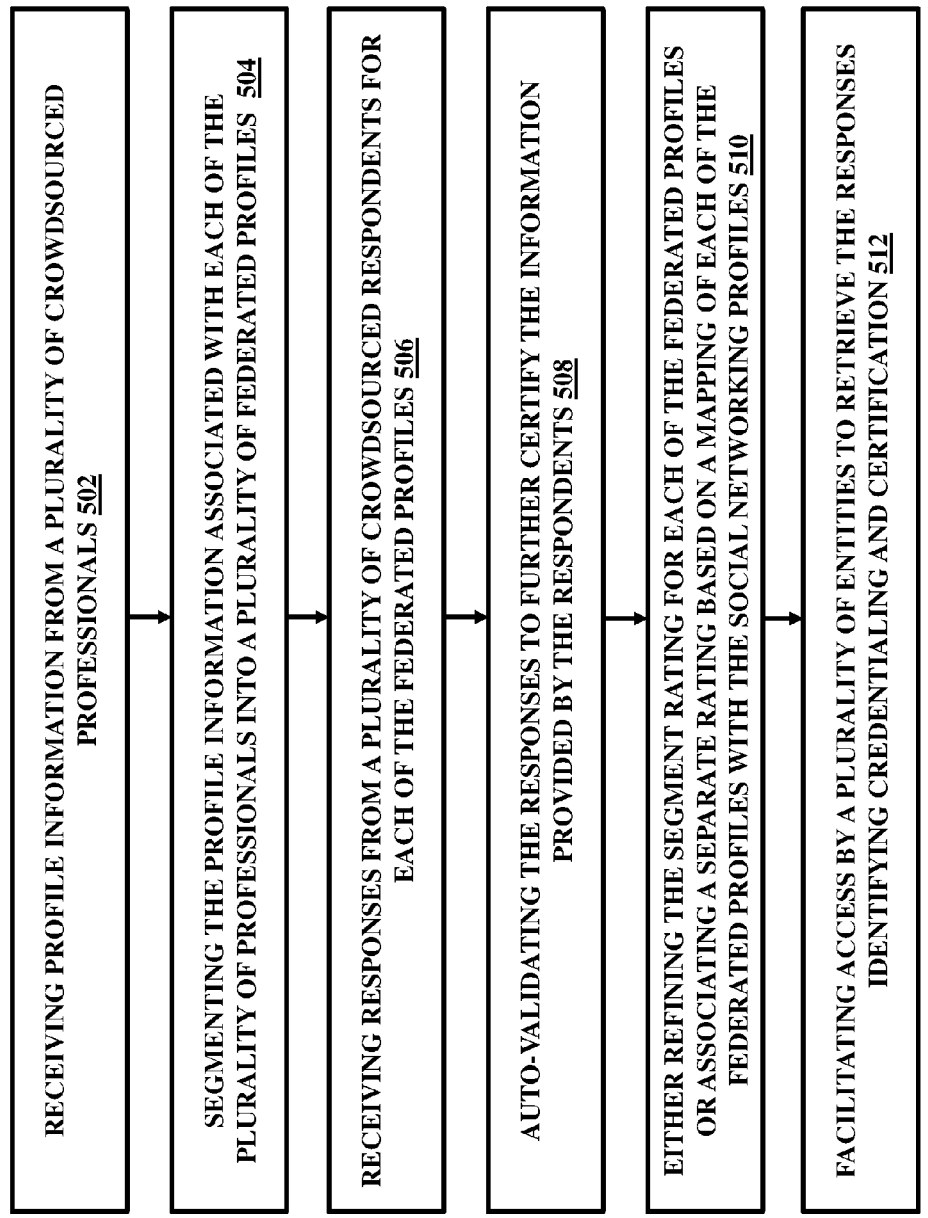
FIG. 5 illustrates a method flowchart for facilitating crowdsourced and multi-level credentialing over the network.

FIG. 5, with reference to FIGS. 1 through 4, illustrates a method flowchart for facilitating crowdsourced and multi-level credentialing over the network for use of multi-level credentialed information through the crowdsourced network 106. The method may include receiving the profile information from the plurality of crowdsourced experts 202 at step 502. The information may include demographic, personal, educational, work history related or other types of details. The method may also include collating the information and creating a common profile specific for each of the experts 202. In other embodiments, the submission of the information by the experts 202 may be performed in an automated and defined way through a web interface such that a profile is automatically created upon submission of the information and/or subscription with the credentialing system 206. The method may further include segmenting the common profile associated with each of the plurality of experts 202 into a plurality of federated profiles at step 504, such that one set of federated profiles is created from a common profile associated with an expert such as 202a. Therefore, two types of profiles: a common profile and federated profiles are maintained by the system 206. The method may further include allowing the federated profiles to be made available in public such that the federated profiles may be viewed by the crowdsourced plurality of respondents 204 or other experts 202. The method may further include receiving responses from the plurality of crowdsourced respondents 204 for the federated profiles at step 506 over a distributed blockchain configured network. The responses may define credentialing of the federated profiles. For example, the system 206 may allow the respondents 204 to credential the information contained in the federated profiles. The more times the verifications or credentialing done by the respondents 204 uniquely, the more accurate and reliable the credentialing of the federated profiles is.

The responses may define certification or credentialing of information contained in the federated profiles and the common profiles. The credentialing may be associated with each of the federated profiles individually and may conclude in either verified as correct or verified as wrong. Further, the crowdsourced credentialing facilitates the certification of each of the federated profiles by one or more respondents 204 so as to cumulate an effect of the certification at multiple levels defined by each respondent. For example, the certification may be done at a first level when a first respondent such as 204a certifies a particular federated profile. The second level certification may be done when another new respondent 204b credentials or verifies the same federated profiles. Similarly, multi-level certification, or credentialing may be performed. The cumulated effect of the certification allows to associate a cumulative segment rating or cumulative federated profile rating to each of the federated profiles associated with each of the experts 202. The responses associated with each of the federated profiles are associated with attributes defining the source and the respondent certifying the federated profiles, and a date of certification by the respondent. It must be appreciated that the terms certification, verification, and credentialing are interchangeably used in the document without any limitations. The method may further include associating a rating to the federated and common profiles after credentialing of the profiles by the respondents 204. The method and system allows the multi-level credentialing by executing the crowdsourced credentialing process and also by performing credentialing of the federated profiles as well as the common profiles.

In some embodiments, the method may further include auto-validating the response or the credentialing done by the plurality of respondents 204 to further certify the information provided by the respondents 204 for each of the federated profiles at step 508. The auto-validation can be performed through one or more sources of the social networking platform 404 that associates an expert such as 202a through a social networking profile of the expert 202a. The method may further include either refining the federated profile rating for each of the federated profiles or associating a separate rating based on a mapping of each of the federated profiles with the social networking profile at step 510. The method may further include facilitating an access by the plurality of entities to retrieve the responses identifying credentialing and certification and the refined or associated rating through the web-based portal operating in the crowdsourced network at step 512. The agencies may thus retrieve credentialed information from the service provider through the system 206 and may not need to individually verify the information about an expert from several sources.

In some embodiments, the method of auto-validating may include automatically searching from a social networking database associated with the social networking sources to verify information about each of the federated profiles. In response to the detection of a mismatch between the searched information and the federated profile, the method may further include suggesting a federated profile update. The method may further include suggesting the social networking profile update to the social networking platform 404. In this manner the service provider may find an opportunity to collaborate with the social networking sources and may continually exchange any update on information from one another such that a credentialing process may flow either sides from both the service provider and the social networking sources.

In some embodiments, the respondents may include one or more of profile owners and other experts or other persons.

In some embodiments, the method may include using the plurality of application programming interfaces (APIs) 406 to allow verification of information associated with each of the federated profiles of the plurality of experts 202 from the social profiles of the professionals or experts 202 maintained by the social networking platform 404. The APIs 406 may be adapted to link each of the federated profiles to one or more distinct sources of the social networking platform 404 such that a unique identifier is maintained that associate a distinct source of the social networking platform 404 to the respective federated profile.

In accordance with an embodiment herein, the system 206 may be configured to perform social crowdsourced credentialing of certified professionals 202.

In accordance with an embodiment herein, the professionals or experts 202 may be accredited or credentialed by the system 206 as required before working in practice locations such a hospitals or other industry location.

In some embodiments, the credentialed expertise of experts may be used for the purposes of evaluation and review and scoring of documents. The document can include without limitations text, media, and other type of digital content or portions and fragments of text, media, or other type of digital content. For example, in an embodiment, the review and scoring and commenting based on the various attributes can be done for an entire document, media, or other types of digital content. In some embodiments, the review and scoring and commenting based on the various attributes can be done for a portion of an entire document, media, or other types of digital content.

In accordance with an embodiment herein, the system 206 is configured to create the federated profiles and/or federated credentialing databases that may allow multiple parties such as respondents 204 to crowdsource and socially credential the professionals 202.

In accordance with an embodiment herein, the system 206 may be configured to facilitate disintermediating of credentialing services by for example allowing practices, hospitals, etc. to share each others' credentialing through the social, crowdsourced, blockchain configured distributed architecture. The system 206 can allow creation of the profiles by the experts 202.

The system 206 is configured to provide a capability or a federation model that may facilitate creating of profiles. These profiles can be exchanged and credentialing information may also be exchanged between various agencies or other parties. In an embodiment, the credentialing system 206 may allow credentialing to be performed amongst specific agencies so that for example if hospital A (first agency or respondent) trusts hospital B (second agency or respondent), and the first agency credential a first part of the profile of a professional and the second agency credential a second part of the profile, then both these agencies may together create a more accurate profile with the use of the system 206 than created independently by sharing the credentialing information known to them individually in the form of responses to the originally created profile. The original profile that is created by the experts 202 serves as the common profile. The profile may then be segmented into federated profiles such that each of the agencies may credential at least one of the federated profiles. Upon thus credentialing, the agencies may share the credentialed federated profiles such that an overall and more accurate accreditation of the originally created profile may be performed by the system 100. The system 100 may also consider the trust factor among the various credentialing parties or agencies or respondents 204. For example, in the example above the first agency may identify that the second agency is a trusted source and therefore any profile credentialed by the second agency may be acceptable by the first agency. Therefore, the agencies 110 amongst themselves can together collaboratively perform credentialing and accreditation by deploying the system 100 internally, in some embodiments, without using a service from a third party service provider.

In an embodiment, the system 206 may allow the respondents 204 to disagree with one another. For example, a single federated profile may be credentialed by one respondent in one manner while the same profile may be credentialed by another respondent in another manner such that the way of credentialing by the second respondent may or may not be contradicting with the way the first respondent credential the same federated profile. Therefore, in such cases, the system 206 may allow to associate a degree of disagreement between the two or more credentialing patterns offered by the two or more respondents 404. The associated metrics or degrees or disagreement may be used by an expert such as 202a or any agency to determine a level of trust for a particular credentialing with respect to a particular federated or a common profile of an expert such as 202a. The credentialing responses from both or more of such respondents 204 may be viewable in the system 206.

In accordance with an embodiment, the system 206 may allow a profile owner who may be an expert such as 202a to dispute the way credentialing is performed by the one or more respondents of 204 with respect to his federated or common profile. The profile owner who can be any one of the experts 202 may offer his remarks through the system 206 which can be viewable by others. Based on such remarks by the profile owner, the system 206 may update, or modify or delete or retain as such the credentialing inputs from the respondents 204.

In some embodiments, the system 206 may define desirable standards for code of conduct by the crowdsourced respondents. In cases of breach of the standards by any of the respondents 204, the system 206 may either invalidate enrollment of the respondents 204 with the system 206 and/or may delete credentialing information provided by such respondents 204 and/or may issue a warning. In cases of subsequent breaches, the system 206 may permanently block such respondents 204 from credentialing any of the professionals or experts associated with the system 206. In an embodiment, the system 206 may therefore be configured to facilitate crowdsourced credentialing in association with the set standards of credentialing. The certification engine 212 may allow the plurality of respondents 204 to respond to the federated profiles associated with the professionals 202 and credential them only when the set standards of conduct are met. In cases of breach of the standards, the certification engine 212 may record details for the respondents 204 and use it as an input in future processing of the credentialing by the same respondents 204.

In some embodiments, the system 206 may further facilitate tracking of the experts' code of conduct or their ethical breaches etc. For example, the system 206 may be configured to associate the profiles of the experts 202 with information pertinent to the code of conduct, ethical lapses, past ethical behavior, recently known ethical lapses and other such information about the experts 202. The information may be collected from various sources or may be reported by any other relevant or reliable expert or person or any member of the crowdsourced network 106 or any member subscribed with the system 206 and the like. Such ethical lapses may be updated in the fragmented and common profiles of the experts 202. In some embodiments, the already credentialed profiles may also be changed or updated based on such ethical information. For example, credentialing information of a doctor as an expert who is credentialed through the system 206 by one or more respondents 204 may be invalidated upon finding of ethical lapses. In such cases, the profile may be directly updated so as to state the new ethical lapses in the profile or the profile may be considered as not credentialed at all, thus withdrawing prior credentials or the profile may be modified in any other manner so as to explicitly report the new lapses in the profile and update it accordingly.

Figure 6:
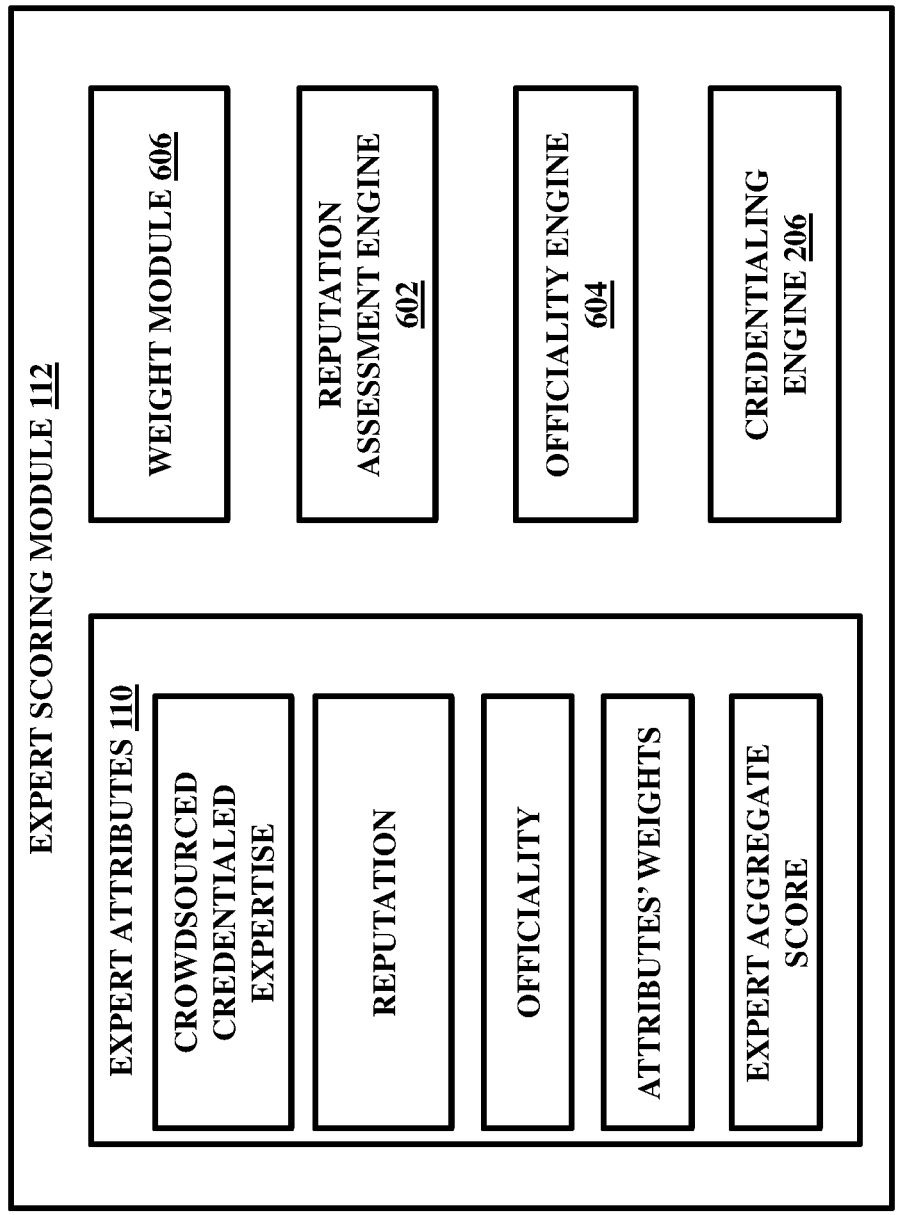
FIG. 6 illustrates an exemplary expert scoring module, in accordance with an embodiment.

FIG. 6, with reference to FIGS. 1 through 5, illustrates an expert scoring module 112 in accordance with an embodiment herein. The expert scoring module 112 determines a set of attributes for the experts 202. In an embodiment, the expert scoring module 112 may be coupled to or may include the expert attributes engine 110 for determining the set of attributes for the experts 202. The set of attributes of the experts 202 may include the crowdsourced credentialed expertise determined by the credentialing system or engine 206 based on the credentialing of the federated and common profiles of the experts 202 by the respondents 204 as discussed above in conjunction with various figures. An extent of the credentialed expertise of the experts 202 by a plurality of crowdsourced respondents 204 determines an extent of credentialed expertise and capability of the experts 202 for review of defined documents for which the credentialed expertise is sought as an attribute. The credentialed expertise defines a non-linear and dynamic parameter of scoring the experts 202 for review of the documents based on the crowdsourcing, in some embodiments.

In an embodiment, the set of attributes for an expert such as 202a may include the reputation of the expert 202a indicative of a trust of a relevant community on the expert 202a. The scoring module 112 may include or be coupled to a reputation assessment engine 602 that determines reputation of the experts 202 that indicate trust of relevant communities on the experts 202. In an example, reputation can be assessed based on experts' interaction with others on expert networking sites, information exchange platforms, and other knowledge interaction platforms. For example, an expert 202a may interact with a community including other experts in a relevant field for example medical equipment design through a knowledge platform. The interaction may be of the type of posting questions relevant to the field of medical equipment design, submitting answers to such questions posted by others, reviewing answers posted by others in response to such questions. Any such interaction may lead to building or losing of reputation of an expert 202a who interacts. The ways of building or losing of the reputation, together referred to as reputation assessment may be defined by the reputation assessment engine 602. The reputation assessment engine 602 may for example evaluate and assess reputation of an expert 202a based on quality of the questions posted by him, quality of the answers posted by him in response to questions posted by others, or quality of review performed by the expert 202a for answers submitted by others. The reputation in such cases may be assessed by calculating number of positive votes from others in the community, number of negative votes in the community, neutral votes in the community to any kind of interactions by the expert 202a. In an embodiment, any positive vote (for example a like comment or remark or vote) for a question posted by the expert 202a may earn him 10 points of reputation, and any negative vote (such as any dislike remark, comment or vote) may cause the expert to lose 10 points from the reputation. In an embodiment, any positive vote on an answer posted by the expert may earn him 20 points and any negative vote on such an answer may cause him to lose 20 points. In an embodiment, any positive vote on a review of an answer by the expert may earn him 25 points and any negative vote by others in the community on such a review may cause him to lose 25 points. In other embodiments, various other ways of assessment of the reputation may be defined without limitations. In an example, the reputation of an expert 202a may be tied to a relevant field or a relevant community by the reputation assessment engine. For example, the reputation assessment engine 602 may allocate a reputation of 50 in the area or community of medical equipments design but the same expert 202a may be allocated a reputation of −20 in the field or community of medical devices programming. The reputation may be defined as positive value points as well as negative value points—the positive points defining a degree of increasing trust by the community, and the negative points defining a decreasing trust by the community.

In an example, the extent of trust may be identified through voting. For example, votes can be posted in integral or fractional numbers such as +3, +3.5, −2, −4.2, and the like. In this way, a net summation of all the votings weighted with reputation assessment parameters (such as mentioned above) that define how much reputation points are earned or lost with each interaction, may result in the reputation of an expert 202a for a particular field or community.

Once the reputation assessment engine 602 evaluates reputation of an expert 202a for a particular field or community (which is same as or similar to the field of the document under review), the document scoring module 112 may use the reputation of the expert 202a for determining score of the document by using the reputation as an expert attribute. In such cases, experts 202 and reputations of experts 202 that are from the same or similar fields or communities as that of the documents under review are considered only so as to establish trust and authority of the experts 202 by the relevant communities and use it as an indicator for validity and authenticity of documents review and scoring after aggregation of reputations from various such experts 202.

In some embodiments, the reputation assessment engine 602 may also be capable of aggregating various discrete reputations from individual crowdsourced experts 202 connected over a blockchain configured network so as to determine an aggregate reputation for a group of crowdsourced experts 202 used in evaluation, reviewing and scoring of a document. The aggregate score may be a net equivalent score that can be associated with the crowdsourced experts 202 to indicate the reputation of the entire crowdsourced community of the experts 202 contributing toward document review and scoring.

In an embodiment, the reputation can be determined by querying internal corporate databases, when users are internal, and from the number of past performance records based on previous projects.

The set of attributes may include an officiality indicative of a position or a designation of an expert 202a in a relevant job. The scoring module 112 may include or be coupled to an officiality engine 604 that determines officiality of the experts 202. In an example, different hierarchical positions as an indicator of officiality may be associated with specific ratings that may be used to associate an officiality score to an expert 202a. The officiality engine 604 may determine such officiality scores for individual crowdsourced experts 202. In some embodiments, the officiality engine 604 may also be capable of determining an aggregate officiality score for a crowdsourced community of the experts 202 that contribute to review and scoring of the document. The aggregate score may be a net equivalent score that can be associated with the crowdsourced experts 202 as a group to indicate the officiality of the entire crowdsourced community of experts 202 contributing toward document review and scoring. In the context of the embodiments herein, officiality refers to a qualitative and/or quantitative evaluation assessment of the crowdsourced community of experts 202. This legitimizes the score provided by the experts 202.

In an embodiment, the attributes are assigned varying weights by a weight module 606. The information about assigned weights of the attributes for the experts relevant for a particular document review and scoring may be stored in the memory circuit 118 and retrieved by the weight module 606 as and when the document is reviewed and scored by the scoring module 112 and the experts 202 are needed for the review and scoring. In an example, the weight module 606 identifies a degree of relevance and significance of an expert attribute with the electronic document to be reviewed and accordingly assign a weight to each of the attributes of the experts based on the identified degree of significance. In an example, the credentialed expertise is weighed as the highest by the weight module 606 followed by the officiality, and the attribute of reputation is weighed as the lowest by the weight module among the three exemplary attributes.

In addition to expertise, officiality, and reputation, other attributes may include without limitations such as geographical presence that is indicative of spatial relationships such as to indicate if a person has lived in a particular area for a while for a defined time, spousal or family or close relationships with other experts, and the like. For example, knowing an expert and having a good relationship with him may be an attribute.

In an example, the weight module 606 is adapted to dynamically change weights and weight assignment based on the type of the document to be reviewed. This could be based on document type and content of the document. For example, the weight assignment may be based on complexity of technology of the document content. The weight module 606 may define content parameters that may influence weight assignment process and accordingly dynamically associate weights to the attributes for considering experts 202 for the document scoring and reviewing process. In an example, the weight module 606 can dynamically associate weights for not only review of the entire document but also intra-document federated sections also. For example, a first set of weights may be defined and associated to various experts' attributes for review of a first section of a document and a second set of weights different from the first set of weights may be defined and associated to a second section of the document. For example, in the first set of weights, the credentialed expertise may be weighted highest while the reputation may be weighed highest in the second set of weights.

In some embodiments, the expert scoring module 112 determines an aggregate score of an expert 202a based on the one or more attributes including credentialed expertise, officiality, and reputation, in association with the assigned weights for the attributes. The expert score defines a rating for the expert that is indicative of expert suitability for review and scoring of a particular document for which the expert 202a is sought.

Figure 7:
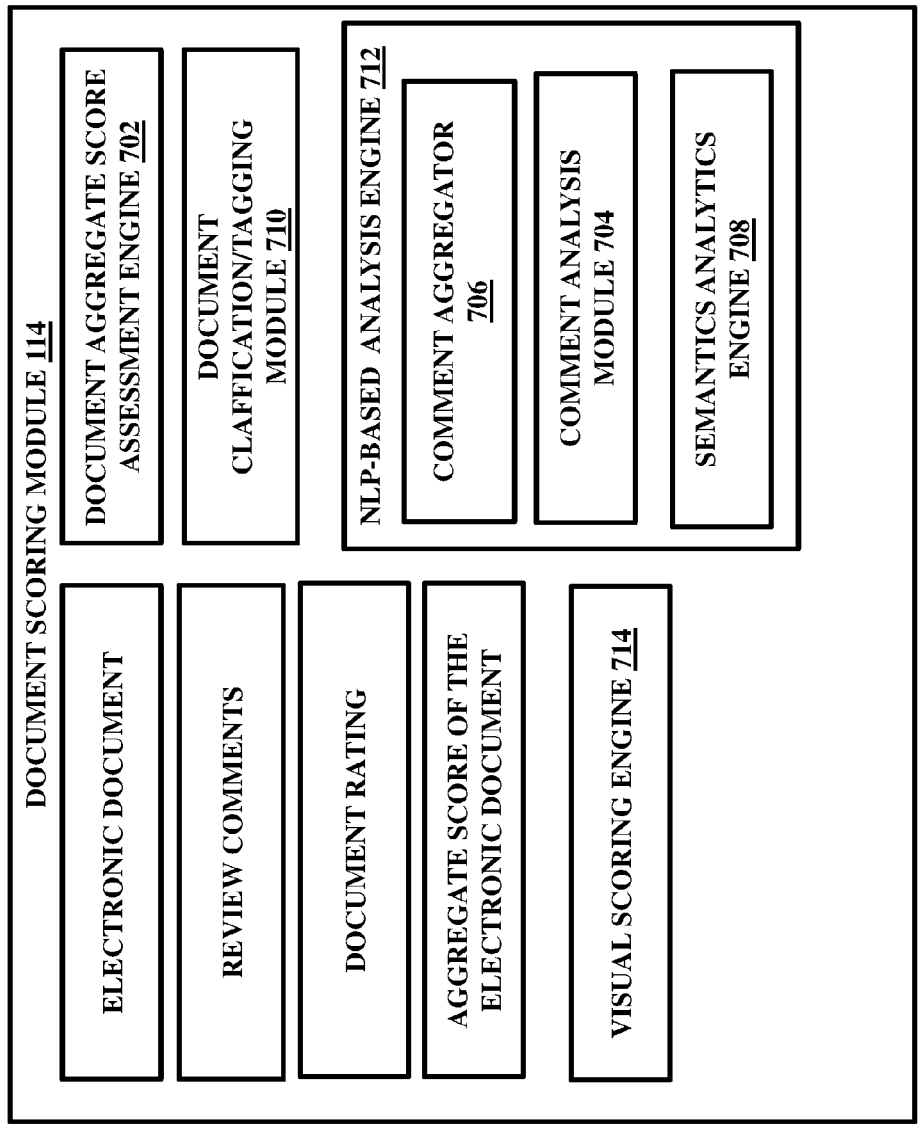
FIG. 7 illustrates a document scoring module in accordance with an embodiment.

FIG. 7, with reference to FIGS. 1 through 6, illustrates a document scoring module 114 in accordance with an exemplary embodiment herein. The document scoring module 114 receives review comments along with a document rating by each of the crowdsourced experts 202 for an electronic document. In an example, a facility of the document reviewing and scoring may be provided only to those experts 202 who possess a defined threshold of the aggregate score as minimum criteria. The document scoring module 114 associates an aggregate score to the electronic document based on aggregation of the review ratings by the crowdsourced experts 202 and the aggregate scores of each of the crowdsourced experts based 202 on the set of attributes including one or more of the credentialed expertise, reputation of the expert, and the officiality. In an embodiment, the document scores by a plurality of crowdsourced experts 202 may be performed based on an affect of crowdsourcing index that may bear a non-linear relationship with the crowdsourcing score. The crowdsourcing index may be associated with the credentialing process or credentialed expertise and may be indicative of a degree of crowdsourcing such that the degree of crowdsourcing non-linearly affects the degree of credentialing that is indicative through the crowdsourcing index. In some embodiments, the crowdsourcing index may be defined in a manner similar to the crowdsourcing index defined for the experts credentialing, as discussed above.

Therefore, the embodiments herein provide a multi-level crowdsourcing-based and calculated document score derived through the use of a non-linearly relational parameter defining a non-linear relationship of the multi-level crowdsourcing on the experts score and the documents score in the respective discrete levels of the multi-level crowdsourcing. In an embodiment, the multi-level crowdsourcing may include two levels of crowdsourcing wherein the first level includes credentialing of an expert 202a by a plurality of crowdsourced respondents 202 and the second level includes scoring of an electronic document by the crowdsourced credentialed experts 202 that show at least a minimum threshold aggregate expert score derived from the first level of crowdsourcing.

In some embodiments, the document scoring module 114 includes a document aggregate score assessment engine 702, comment analysis module 704, comment aggregator 706, semantics and analytics engine 708, and document classification/tagging module 710.

In some embodiments, the document aggregate score assessment engine 702 determines an aggregate score of the document based on individual scores of the document from individual crowdsourced experts 202. The document aggregate score assessment engine 702 may also utilize a non-linear crowdsourcing index for determining the aggregate score. The comment analysis module 704 may analyze review comments posted by the experts 202 while reviewing the documents. The comments serve as a learning and knowledge repository in evaluating the document in detail. The aggregate score of the document may thus be associated with a subjective comment section for use by second level reviewers etc. The comment analysis module 704 may be coupled to or may include the comment aggregator 706. The comment aggregator 706 may collate comments from various individual experts 202. For example, the comment aggregator 706 may collate similar types of comments together. The comment aggregator 706 and comment analysis module 704 may be coupled to the semantics and analytics engine 708 that facilitates comments classification, collation, and analysis by implementing various semantics, analytics, and learning algorithms, functions, tools, programs and the like. The semantics engine 708 infers logical consequences from the review comments. The semantics engine 708 utilizes semantics and machine learning tools to determine intent and contextual meaning of terms as they appear in content of the review comments to generate more relevant results. The document classification/tagging module 710 may determine a relevant category or taxonomy class and accordingly tag the document for the classified category. The category may be decided based on for example defined classes, based on technology areas and sub areas, based on reviews, based on value of content and the like.

The comment aggregator 706, comment analysis module 704, and the semantics analytics engine 708 together may be referred to as Natural Language Processing-based analysis engine (NLP-based analysis engine) 712. The NLP-based analysis engine 712 may be configured to process textual information-based reviews and comments generated as part of textual review of the electronic documents by the experts 202.

Figure 8:
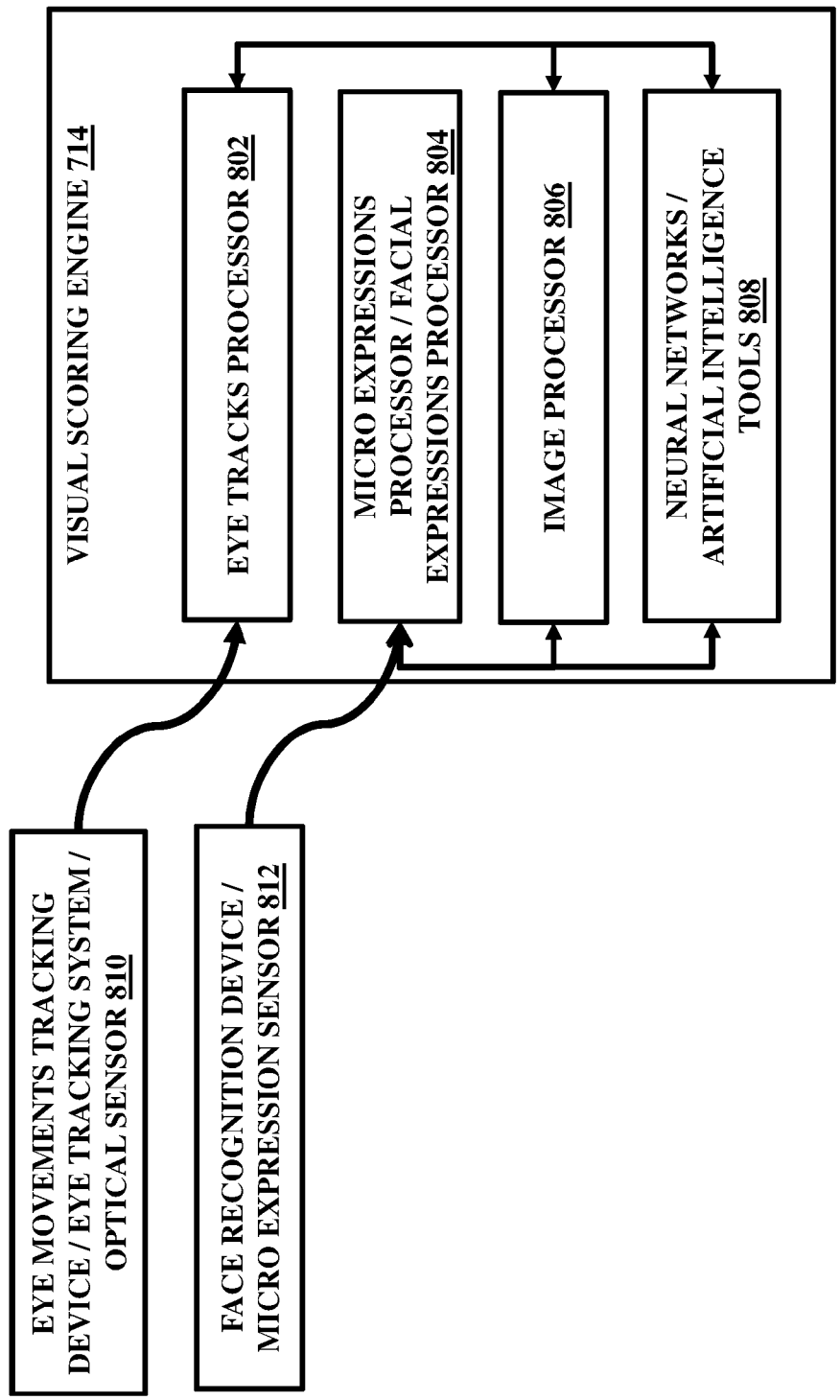
FIG. 8 illustrates a visual scoring engine, in accordance with an embodiment.

The document scoring module 114 further includes a visual scoring engine 714 for processing visual and non-language or non-textual feedback and reviews by the experts 202 during review of the electronic documents. In an example, various components of the visual scoring engine 714 are illustrated in FIG. 8. The visual scoring engine 714 and visual reviews by the experts 202 are discussed herein with reference to various figures and in particular to FIGS. 7 and 8.

The visual scoring engine 714 may include an eye tracks processor 802, a micro expressions processor 804, an image processor 806, and neural networks 808. The eye tracks processor 802 may receive inputs from an eye movements tracking device or an eye tracking system 810 which may be associated with a computing device of an expert such as 202*a* so that when the expert 202*a* reviews a document, the computing device may capture eye movements during an entire review process and transmit the information to the server 108 which hosts the eye tracks processor within the visual scoring engine 714. The eye tracking system 810 may be configured to accurately measure fast eye movements and may be controlled by a microprocessor and software to rapidly track the expert's eye movements. The eye tracking system 810 may include a camera also. The hardware for the eye tracking system 810 may include a quadrant detector which may detect the relative direction of movement of the expert's eyes. The output of the quadrant detector may be processed by the microprocessor under the control of software subsystems. The eye tracking system 810 may record an entire review session and eye movements involved in the review session so that a digital file containing the recorded session indicative of eye movements and eye tracks may be transmitted to the eye tracks processor 802 for processing and subsequent scoring of visual reviews by the visual scoring engine 714. The eye tracks processor 802 of the visual scoring engine 714 may process the data received from the eye tracking system 810 with the use of special purpose processing circuitry and software subsystems which enable interpretation of the data signifying eye tracks and movements. The eye tracks processor 802 may convert the data into high level interpretations indicative of time lapse on specific sections of the document under review, repeat reading, coherence between eye focus and scrolling speed, blinks, expert's gaze location, eye fixations, saccades, gaze rate, gaze direction, gaze percentage, number of fixations, scan path directionality, instances of backtracking, frequency of long duration dwells over areas of interest, saccade length, fixation/saccade time ratio, visual profile of review-flow and the like. These interpretations may be compared with predefined and pre-stored eye patterns or vocabularies. The predefined eye patterns and vocabularies may also signify particular interpretations and associated scores so that upon comparison of the interpretations gathered by analyzing the data by the eye tracks processor 802 and the predefined patterns and respective interpretations, the eye tracks processor 802 may associate a review score for the eye tracks which may indicate quality of review based on eye movements. The eye tracks processor 802 may process the recorded eye tracking data and convert it into high level interpretations to reveal information about eye behaviors and basic mental states of the expert such as expert 202*a*.

The eye tracking information may be used to determine points of interest in an image or a text of the document under review. For example, a content provider may present an image or text for review so that the eye tracking information may then be used to determine which sections of the image or text information tend to draw the expert's attention and accordingly associate a visual score using predefined interpretations and eye tracks patterns which may be indicative of visual feedback and review and quality of the reviewed content accordingly.

The visual scoring engine 714 may further include the micro expressions processor 804 which may receive data indicative of micro expressions from a micro expressions sensor 812 which may be associated with a computing device of an expert such as 202*a* so that when the expert 202*a* reviews a document, the micro expressions sensor 812 may capture micro expressions or facial expressions during an entire review process and transmit the information to the visual scoring engine 714 which hosts the micro expressions processor 804. The micro expressions processor 804 may work along with the image processor 806 to interpret micro expressions and facial expressions received from the micro expressions sensor 812. In an example, the image processor 806 may contain the micro expressions processor 804. In an example, the image processor 806 and the micro expressions processor 804 may be discrete components that are connected communicatively and operatively.

The micro expressions sensor 812 may be associated with the computing device of the expert 202*a*. The micro expressions sensor 812 may be configured to sense human expressions and gestures and convey this sensed information to the micro expressions processor 804. In an example, the micro expressions sensor 812 may be configured within a camera or an optical sensor. The micro expressions sensor 812 may be configured for image (or video) acquisition, face detection, and recognition.

The image processor 806 may contain image processing circuitry and an associated memory. The image processor 806 may receive the data from the micro expressions sensor 812 and perform pre-processing and processing tasks such as normalizing the data and extracting certain facial images using various imaging filters. The image pre-processing and processing tasks may involve cropping, re-sizing, lighting, coloring, masking to extract certain facial features, eliminating unwanted features such as hair, background, extraneous features in the facial data sensed by the facial expressions sensor 812 which provide no information about facial expressions. The image processor 806 generates an output to be used by the micro expressions processor 804 to recognize and interpret micro expressions during the review process by the expert 202*a* using such as mathematical algorithms without limitations. These interpretations of the micro expressions may be indicative of human facial characteristics, moods, emotions, gestures etc. The facial characteristics, moods, emotions, gestures etc. together referred as micro expressions are read through micro movements of bodies of the experts 202 by the facial expressions sensor 812. This is used as an input by the micro expression processor 804 and interpreted using complex algorithms either using statistical approaches or artificial intelligence and neural networks 808. The micro expressions processor 804 may be configured to locate human face and associated physical/facial characteristics of an individual. In an embodiment, the micro expressions processor 804 may detect faces in a plurality of video frames as input and extract dynamic facial expressions and movements into an output file.

The interpreted facial expressions may reveal information about the review by the experts 202. The micro expressions processor 804 may store predefined expressions patterns within a memory circuit which may be used to correlate the sensed and processed micro expressions and facial inputs to determine expert's review thoughts in the form of a visual feedback. These micro expressions may even allow interpreting review thoughts that might otherwise remain involuntarily hidden and suppressed in a textual review or text-based comments.

The interpreted micro facial expressions may be compared with the predefined facial expression patterns or vocabularies stored in the memory circuit associated with the visual scoring engine such as the memory circuit 118. The predefined patterns and vocabularies may signify particular interpretations and associated scores so that upon comparison of the interpretations gathered by analyzing the data by the micro expressions processor 806 and the predefined patterns and respective interpretations, the micro expressions processor 804 may associate a review score for the micro expressions which may indicate quality of review based on facial expressions. Thus, the visual scoring engine 714 may associate another score based on micro expressions.

The review score associated by the eye tracks processor 802 and the review score associated by the micro expressions processor 804 may together constitute visual scores determined by the visual scoring engine as part of entire review of electronic documents by the experts.

The document aggregate score assessment engine 702 may collate the review scores obtained from the NLP-based analysis engine 712 based on textual scoring, visual scores obtained from the eye tracks processor 802 and the micro expressions processor 804, in accordance with various algorithmic, mathematical, empirical, statistical and other types of tools as discussed elsewhere in the document in accordance with various embodiments.

In an example, various empirical relations such as mentioned below without limitations may be used to determine the aggregate document score based on individual attributes of the crowdsourced experts 202, scores of the crowdsourced experts 202, document scores by individual experts 202, aggregation of the experts scores, aggregation of the attributes scores, aggregation of the document's individual scores (textual as well as visual scores), multi-level crowdsourcing index, and aggregation of multiple multi-level crowdsourcing indices.

In accordance with some embodiments as discussed above, the aggregate score of an expert (AES) for one or more attributes may be determined based on an empirical relation. An exemplary empirical relation may be as follows:

$$AES = EW1 + RW2 + OW3$$

Above, 'E' represents credentialed expertise, 'R' represents reputation, and 'O' represents officiality, and W1, W2, W3 represent weightage of the credentialed expertise, reputation, and officiality respectively. In other embodiments, other similar empirical or non-empirical relationships with modifications may be considered without limitations.

In accordance with some embodiments as discussed above, the credentialing engine may evaluate the credentialed expertise (E) for the expert based on an empirical relation. In an example, the empirical relation can be as follows:

$$E = (P_{F11} + P_{F12} + \ldots + P_{F1N}) \times (P_{F21} + P_{F22} + \ldots P_{F2N}) X \ldots X (P_{FZ1} + P_{FZ2} + \ldots + P_{FZN})$$

Above, $P_{F11}$ represents credentialed federated profile score for a first federated profile of a first expert by a first respondent, $P_{F12}$ represents credentialed federated profile score for the first federated profile of the first expert by a second respondent, $P_{F1N}$ represents credentialed federated profile score for the first federated profile of the first expert by an Nth respondent, $P_{F21}$ represents credentialed federated profile score for a second federated profile of the first expert by the first respondent, $P_{F22}$ represents credentialed federated profile score for the second federated profile of the first expert by the second respondent, $P_{F2N}$ represents credentialed federated profile score for the second federated profile of the first expert by the Nth respondent, $P_{FZ1}$ represents credentialed federated profile score for a Zth federated profile of the first expert by the first respondent, $P_{FZ2}$ represents credentialed federated profile score for the Zth federated profile of the first expert by the second respondent, and $P_{FZN}$ represents credentialed federated profile score for the Zth federated profile of the first expert by the Nth respondent.

In an example, the empirical relation above considers profiles scores for entire federated profiles from 1 to Z. In an example, the empirical relation above considers all respondents 204 from 1 to N. In accordance with other embodiments, other similar empirical or non-empirical relationships with modifications may be considered without limitations.

In accordance with some embodiments as discussed above, the document reviewing and scoring engine 114 evaluates aggregate crowdsourced document score (ACDS) based on credentialed expertise and other attributes of the crowdsourced experts, based on an empirical relation. An exemplary relation can be as follows:

$$ACDS = \{(E_1+E_2+E_3+\ldots+E_X)W_1 + (R_1+R_2+R_3+\ldots+R_X)W_2 + (O_1+O_2+O_3+\ldots+O_X)W_3\} (D_1+D_2+D_3+\ldots+D_X)CI$$

$E_1, E_2, E_3, \ldots E_X$ represent respective credentialed expertise of X number of crowdsourced experts,
$R_1, R_2, R_3, \ldots R_X$ represent respective reputation of the X number of crowdsourced experts,
$O_1, O_2, O_3, \ldots O_X$ represent respective officiality of the X number of crowdsourced experts,
$D_1, D_2, D_3 \ldots D_X$ represent respective document scores earned by the X number of crowdsourced experts, and
CI represents Non-Linear Crowdsourcing Index.
In other embodiments, other similar empirical or non-empirical relationships with modifications may be considered without limitations.

In some embodiments, the CI is defined non-linearly with integral ranges (R) of experts who credential the document. In an example, first five of the ranges can be as follows without limitations:
CI=1, when R=0-2 experts,
CI=1.2, when R=3-4 experts,
CI=1.5, when R=5-6 experts
CI=1.9, when R=7-8 experts, and
CI=2.5, when R=9-10 experts.

In an example, the CI may be calculated based on an empirical relationship that dynamically determines value of the CI with every integral change in number of expert credentialing the document.

The embodiments herein can employ other empirical and non-empirical tools for expert scoring and document scoring and other such tasks as discussed above. Some embodiments herein use machine learning techniques for performing various tasks to allow crowdsourced learning for document scoring.

Some embodiments herein, as discussed above, may facilitate use of credentialed expertise and other attributes to perform crowdsourced document review and scoring that may then be able to be submitted to government agencies or other grant-based organizations. The embodiments herein may allow a crowd of credentialed experts to review ideas, proposals, etc. and give a common (anonymous or attributed) "score" for each section of the document through various means (rating, reading, discussions with others, etc.). The embodiments herein may facilitate running large meetings, or clustered meetings. The embodiments herein may facilitate handing of issues arising due to lack of in-person participation support. The embodiments herein may facilitate in conducting synchronous meetings, avoid several human touch points effectively, handle issues arising out of lack of support for on demand changes. The embodiments herein may facilitate overcoming several other issues and challenges that exist in conventional systems and methods such as dependency on a computer, lack of integration with other systems, less interactive with other members. The embodiments herein allow substantial increase in number of simultaneous meetings/applications/reviewers and supports clustered meetings. The embodiments herein provide support for both synchronous and asynchronous meetings. The embodiments herein can support hybrid meetings (in-person, web, audio and video). The embodiments herein can support manual/ad-hoc meetings. The embodiments herein can provide an improved communication among the members of the meeting. The embodiments herein can facilitate reducing pre and post meeting times by more automation. The embodiments herein allow increases in the number of participants that can score an application in less time.

The electronic document and review system of the embodiments herein enables secure asynchronous and synchronous meetings and collaboration between reviewers and government officials through web, audio, and video. The system automates recruiting and approval of experts to facilitate both anonymous and attributed reviews of grants applications. The system enables secure reviews that can be conducted on mobile devices such as tablets or traditional PCs. The system facilitates recording or archiving of records. The system enabled an automated customer care. The system enables human-less automated answering using knowledge base. The system enables connecting personnel to right support professionals. The system facilitates and enables asynchronous and synchronous meetings and collaboration between reviewers and government officials through web, audio, and video. The system provides easy integration with other systems.

In some embodiments, the document can include without limitations text, media, and other type of digital content or portions and fragments of text, media, or other type of digital content. For example, in an embodiment, the review and scoring and commenting based on the various attributes can be done for an entire document, media, or other types of digital content. In some embodiments, the review and scoring and commenting based on the various attributes can be done for portions of an entire document, media, or other types of digital content. In an embodiment, the document scoring module 114 can distribute (hand out) documents, document fragments, media, content or content fragments to the experts 202 based on the content of the documents and the experts' attributes. That means that the scoring module 114 can understand who knows what and based on the content of documents it can distribute all or portions of the document to various experts 202.

In accordance with some embodiments herein, the system, and various modules and engines in the system discussed above may facilitate interaction among various experts and entities within an organization, and across and outside an organization as well, without limitations.

Figure 9:
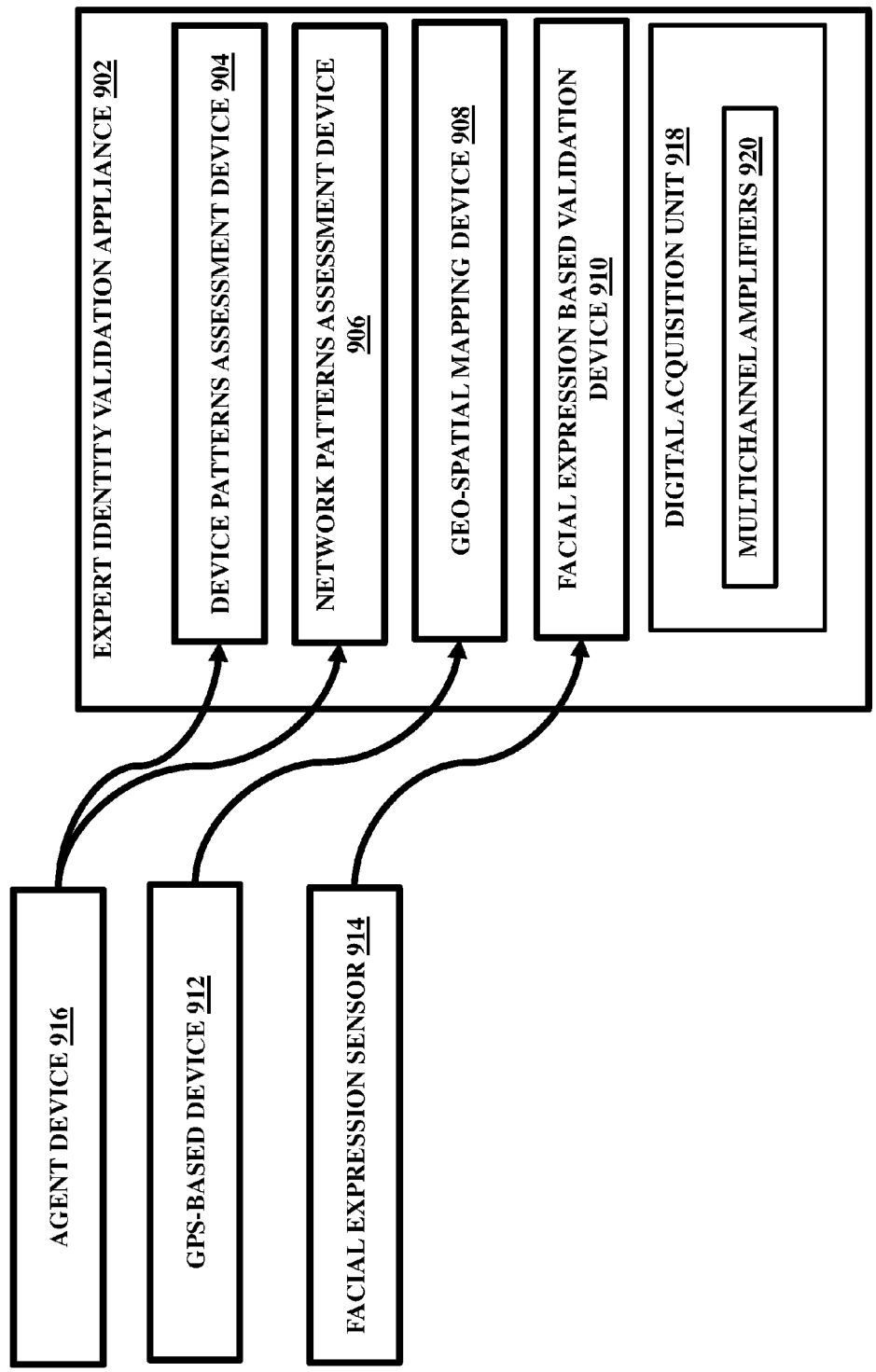
FIG. 9 illustrates an expert identity validation device, in accordance with an embodiment.

In accordance with various embodiments, the electronic document review and scoring system may be configured to validate identities of the experts 202 for review of the documents to ensure that the documents are reviewed by the experts 202 who are assigned the documents for review and not by fraudulent parties or by someone else on behalf of the experts 202. The electronic document review and scoring system 102 therefore may include or be operatively coupled to a blockchain configured expert identity validation appliance 902 as shown in FIG. 9. The blockchain configured expert identity validation appliance 902 may include a device patterns assessment device 904, a network patterns assessment device 906, a geo-spatial mapping device 908, and a facial expression-based validation device 910.

The blockchain configured expert identity validation appliance 902 may use inputs and vocabularies from the memory circuit such as the memory circuit 118 to identify rules and accordingly execute advanced blockchain validation mechanisms to verify identities of the experts 202 who review the documents through the distributed blockchain configured electronic document review and scoring system 102.

The blockchain configured expert identity validation appliance 902 may include a non-volatile computer-readable memory and a processor which may be configured to receive a private key from experts 202. The experts 202 may be authorized to review the documents privately using the private key. One of ordinary skill in the art would recognize there can be a variety of different proof standards that could be used by the blockchain configured expert identity validation appliance 902. The proof standard may be based on proof of work, such as hash value requirements, proof of stake, such as a key or other indicator of consensus, or any other kind or proof of consensus. The proof standard may be applied as a rule that may require a hash value to be less than the proof standard, more than the proof standard, or have a required bit sequence or a required number of leading or trailing zeroes. Any proof standard may be used without departing from the spirit and scope of the embodiments herein.

The blockchain configured expert identity validation appliance 902 may be configured to validate identity of an expert such as 202a accessing the documents for review to establish a trusted information review and interaction. The blockchain configured expert identity validation appliance 902 may utilize a variety of identity validation algorithms and schemes such as but not limited to facial expressions, geographical coordinates, geo-tags, gestures, muscle activity, and the like. In accordance with a specific type of validation scheme utilized by the blockchain configured expert identity validation appliance 902, a validation scheme-based device may be utilized. Few embodiments, in particular, are discussed herein in conjunction with FIG. 9 that provide for the use of geo-spatial mapping, facial expression, network patterns assessment, device patterns assessment for validation of identities of the experts 202 performing review of the documents.

In an embodiment, the blockchain configured expert identity validation appliance 902 may obtain geographical coordinates associated with an expert 202a from a global position system (GPS)-based device 912 associated with the expert 202a. The blockchain configured expert identity validation appliance 902 may tag the documents reviewed by the expert 202a using geo-tags to establish a geographical identity with the documents reviewed by the expert 202a. The geo-tags may be used to validate identity of the expert 202a. For example, the expert 202a may reside in a particular state of the United States as noted from the expert's demographic information stored in the memory circuit 118. However, if the GPS-based device 912 sends geographical coordinates that indicate another location remote from the United States, the blockchain configured expert identity validation appliance 902 may establish a conflict and may not verify such a review provided by such an expert 202a coming from a conflicting geography. If the expert 202a is able to satisfy validation and authorization requirements, the review may then be accepted or else may remain suspended until the requirements are met. The geo-spatial mapping device 908 may perform geo-tagging of the experts 202 and the reviewed documents and also compare the geo-tags with pre-stored information about the experts 202 for processing validation.

In an embodiment, the blockchain configured expert identity validation appliance 902 may extract information pertaining to facial expressions of an expert such as the expert 202a from an associated facial expression sensor 914. The facial expression sensor 914 may be of a variety of types to identify and sense a variety of facial expressions. The sensed facial expressions may be communicated to the blockchain configured expert identity validation appliance 902 which may be used by the facial expression-based validation device 910 of the blockchain configured expert identity validation appliance 902 to perform processing of the sensed facial expressions and verify the identity in accordance with predefined facial patterns of the expert 202a stored in the memory circuit 118.

The facial expression sensor (also referred to as face recognition sensor interchangeably) 914 may perform automatic face recognition for surveillance, security, authentication or verification purposes of the experts 202. Information detected by the facial expression sensor 914 may not only expose sensation or passion of experts 202 but can also be used to judge their mental views and psychosomatic aspects. The facial expression sensor 914 may employ one or more of different techniques such as motion-based approach, muscle-based approach or any other approach without limitations. These approaches may such as involve analysis of aspects originating from bones, tissues, skin, muscles, deformities, contractions, expansions, and so on. The facial expression sensor 914 may sense the information and transmit the sensed information to the facial expression-based validation device 910 of the blockchain configured expert identity validation appliance 902 so that the blockchain configured expert identity validation appliance 902 may identify and verify the experts 202 interacting with the blockchain configured electronic document review and scoring system 102 based on pre-defined parameters signifying complex facial expressions for genuineness and fraud. These pre-defined parameters and related details may be stored in the memory circuit 118 associated with the blockchain configured expert identity validation appliance 902.

The network patterns assessment device 906 may process network information, metadata information, and other network queries and compare with pre-stored fake network patterns and individual network patterns of the experts 202 based on historical data and usage preferences, and generate an output indicative of how reliable an expert review is and whether the expert identity is verified and whether the authorized expert himself performed the review or anyone else reviewed the documents on his behalf, based on its network information.

The network information, metadata information, and other network queries may be extracted by an agent device 916 associated with a computing device and transmitted to the network patterns assessment device 906 for further processing and verification of identity. In an embodiment, the agent device 916 may watch browser and network behavior and aggregated behavioral and network information can be submitted to the blockchain configured expert identity verification appliance 902 as and when a review is submitted. The behavioral information may be used by the blockchain configured expert identity verification appliance 902 to validate whether the behavior exhibited by the expert during review of the documents is in accordance with a preferred and routine behavior of the expert as pre-stored in the memory circuit 118. In an example, the agent device 916 may extract the network information and periodically (or as and when a review is made) update the blockchain configured expert identity verification appliance 902 about the network information. The blockchain configured expert identity verification appliance 902 may for example validate whether the network connections are permissible for the particular expert that submits the review or is coming from a suspicious network.

In an example, the agent device 916 may extract device information and transmit the device information to the device patterns assessment device 904. The device information may include information such as model, serial number, and other information of the computing system associated with the expert 202a. The device patterns assessment device 904 may compare the device information received from the agent device 916 with pres-stored device information about the expert 202a and associated computing system based on historical data or usage preferences or based on pre-defined submitted device information by the expert 202a.

The blockchain configured expert identity verification appliance 902 may include a digital acquisition unit 918 to receive and process signals containing the sensed contextual information from the GPS-based device 912, facial expression sensor 914, and agent device 916. The digital acquisition unit 918 may be configured to perform real-time assessments of the sensed received contextual information. The digital acquisition unit 918 may include a plurality of multichannel amplifiers 920. Each amplifier of the multichannel amplifiers 920 may be defined to receive a specific type of sensed information from a particular type of sensor and device. The amplified signals obtained from the plurality of multichannel amplifiers 920 are then transmitted to respective processors such as the device patterns assessment device 904, network patterns assessment device 906, geo-spatial mapping device 908, and facial expression-based validation device 910. The digital processing unit 918 is implemented using an integrated circuit.

Figure 10:
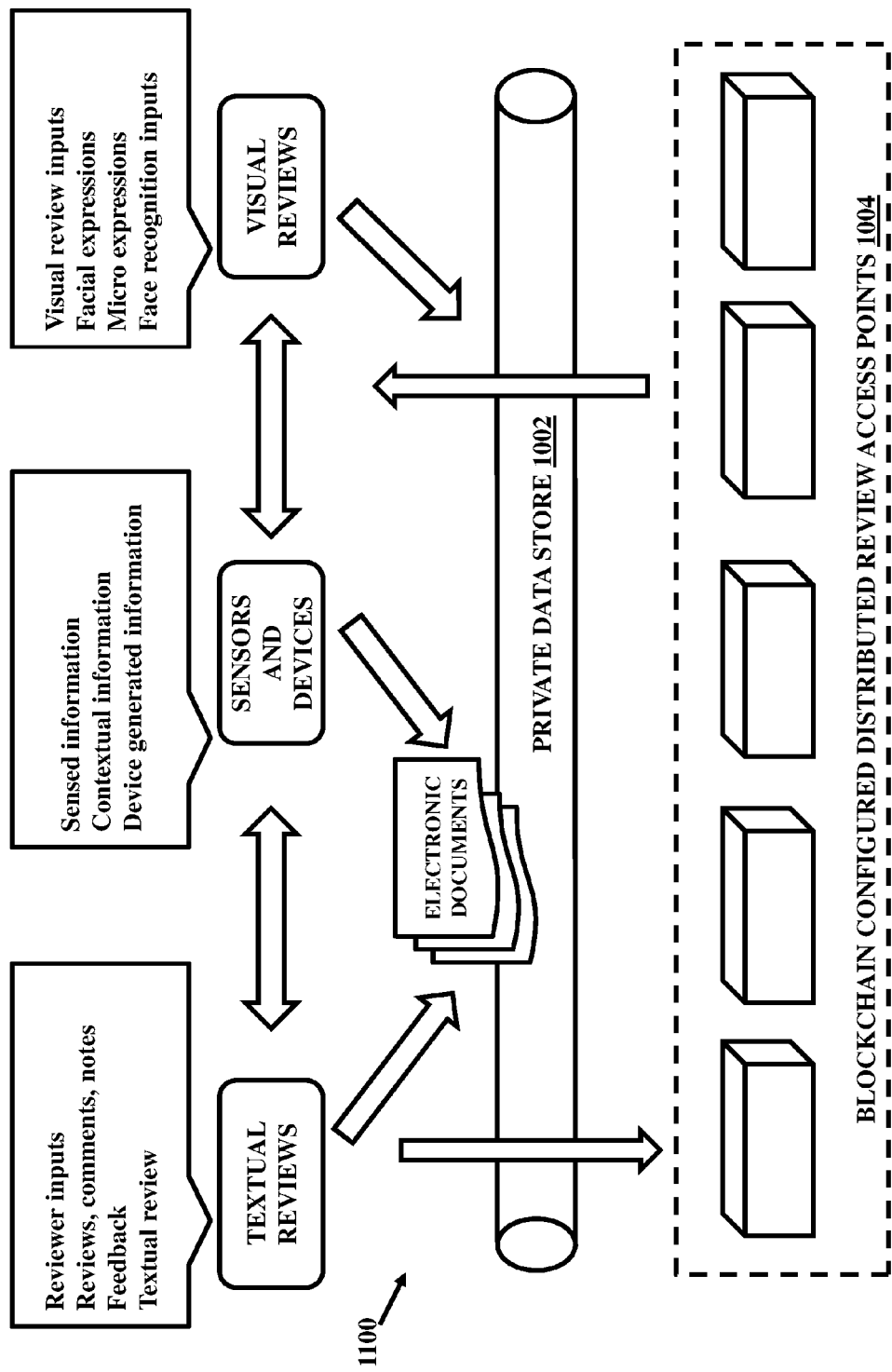
FIGS. 10 and 11 illustrate a blockchain configured architecture of an electronic document review and scoring system, in accordance with an embodiment.

FIG. 10, with reference to FIGS. 1 through 9, illustrates a section of a blockchain configured ecosystem 1100 for enabling electronic documents review and scoring by the experts 202 in accordance with an embodiment. At least some embodiments for enabling various reviews and scoring transactions are discussed herein.

The blockchain configured electronic document review and scoring system 102 may provide a private view to the experts 202 referred to as private data store 1002 so that each expert can privately access certain documents allocated to them for review based on various policies such as based on their respective aggregated scores. Each of the experts 202 may access the documents through the dedicated private store 1002 available through the plurality of distributed blockchain configured access points 1004 which may be enabled in the form of distributed blocks as shown in FIG. 10, with each block providing a facility to access the blockchain configured electronic document review and scoring system 102 by multiple experts 202 and respondents 204 at the same time based on defined and granted access rights.

The private data store 1002 may provide a virtual storage to facilitate interaction, information exchange, reviewing, and presentation of documents for review according to granted access for an expert 202a. For example, the private data store 1002 may allow a virtual storage and presentation of only limited documents or portions of the documents for access by particular experts 202 in accordance with permissions granted to the experts 202 for reviewing. The private data store 1002 may be configured to auto-hash review interactions at any required interval. This compartmentalization of the documents ensures that the documents are secured and private as per access rights authorized to the experts 202. The data presented on the private data store 1002 of the blockchain serves as a secure way to ensure that the private data store 1002 is in sync with any permissioned access.

In accordance with an exemplary use case of the current embodiment, an expert 202a may enter his/her review comments and feedback into the blockchain configured electronic documents review and scoring system 102 by accessing the blockchain configured electronic document review and scoring system 102 or the feedback and review comments may be extracted from associated devices, sensors, scanners, and networks, and moved into the electronic document review and scoring system 102 through the plurality of distributed access points 1004.

In an embodiment, the blockchain configured digital ecosystem 1100 may provide a federated blockchain consisting of several entities/participants and associated computers and devices and sensors that jointly create the reviews and attempts to process transfers of data through a trusted, secured and distributed network of the blockchain configured access points 1004. Federations can be organized by systems of care such as identified by geography, e.g. community or state. The experts 1002 may be assumed to stay within these systems of care that cross organizations. In an example, the federated blockchain may be applied on top of an existing health information exchange community as a way to further reduce costs and help the community reach financial sustainability.

In accordance with an embodiment, the experts 202 can access the documents for review based on authorization and access rights granted which may dynamically be updated in accordance with embodiments as discussed elsewhere in the document and in accordance with growing scores such as credentialed score, officiality, etc. The blockchain configured expert identity validation appliance 902 may be configured to validate the identity of the experts 202 accessing the documents and performing reviews to establish a trusted information review process. The blockchain configured expert identity validation appliance 902 may utilize a variety of identity validation algorithms and schemes such as but not limited to facial expressions, geographical coordinates, geo-tags, gestures, muscle activity, and the like. In accordance with a specific type of validation scheme utilized by the blockchain validation device, a validation scheme-based device may be utilized as discussed above.

Figure 11:
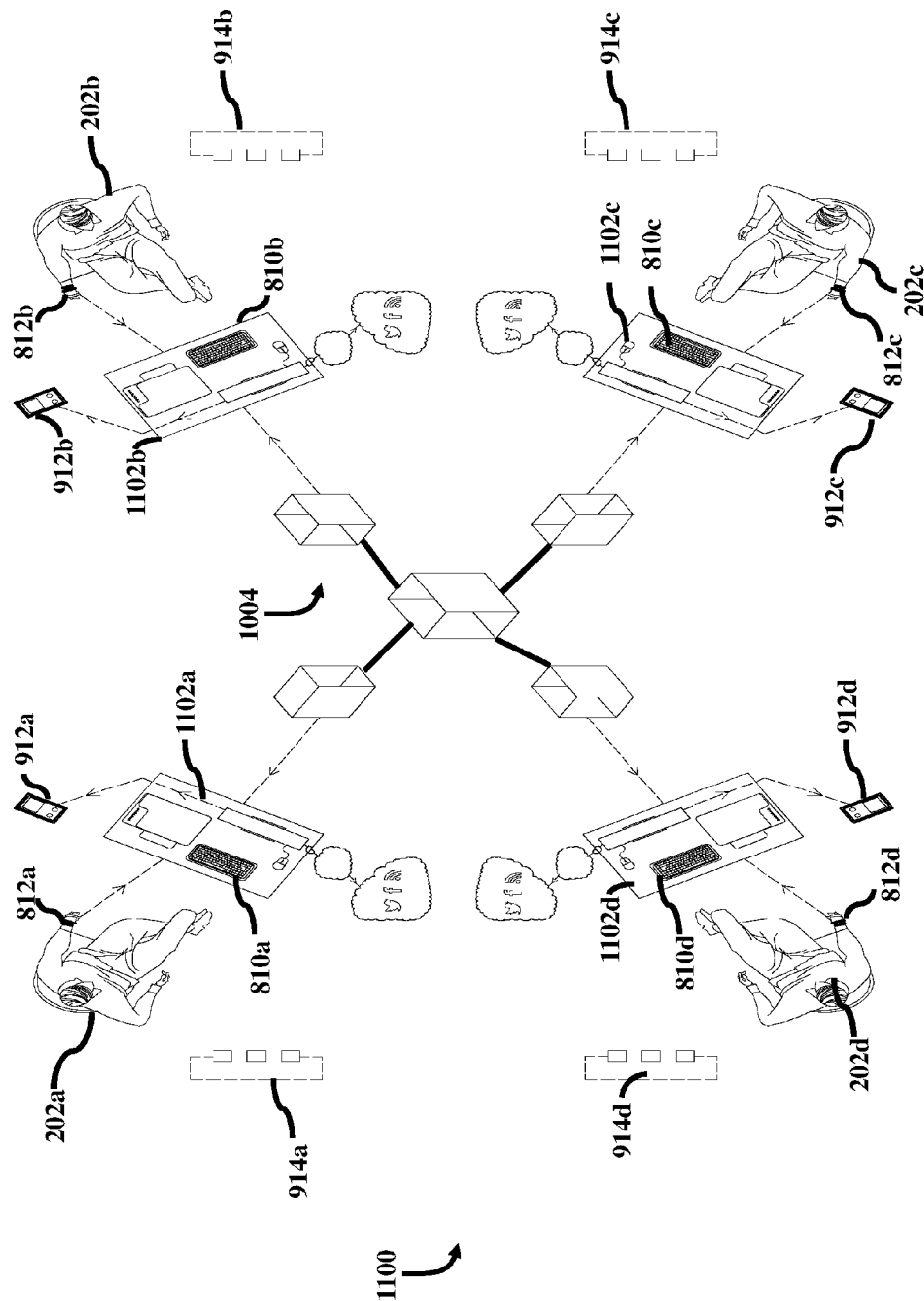

FIG. 11, with reference to FIGS. 1 through 10, illustrates another view of a portion of the digital ecosystem 1100 illustrating multiple experts 202a, 202b, 202c, 202d (together 202); respective associated computing systems 1102a, 1102b, 1102c, and 1102d; respective associated GPS-based devices 912a, 912b, 912c, and 912d; respective associated facial expression sensors 914a, 914b, 914c, and 914d; respective associated cameras or optical sensors 810a, 810b, 810c, and 810d; respective associated facial expression sensors and face recognition devices 912a, 912b, 912c, and 912d communicating with the system 102 through plurality of distributed blockchain configured access points 1004 for electronic documents reviewing as discussed in accordance with various embodiments.

Figure 12:
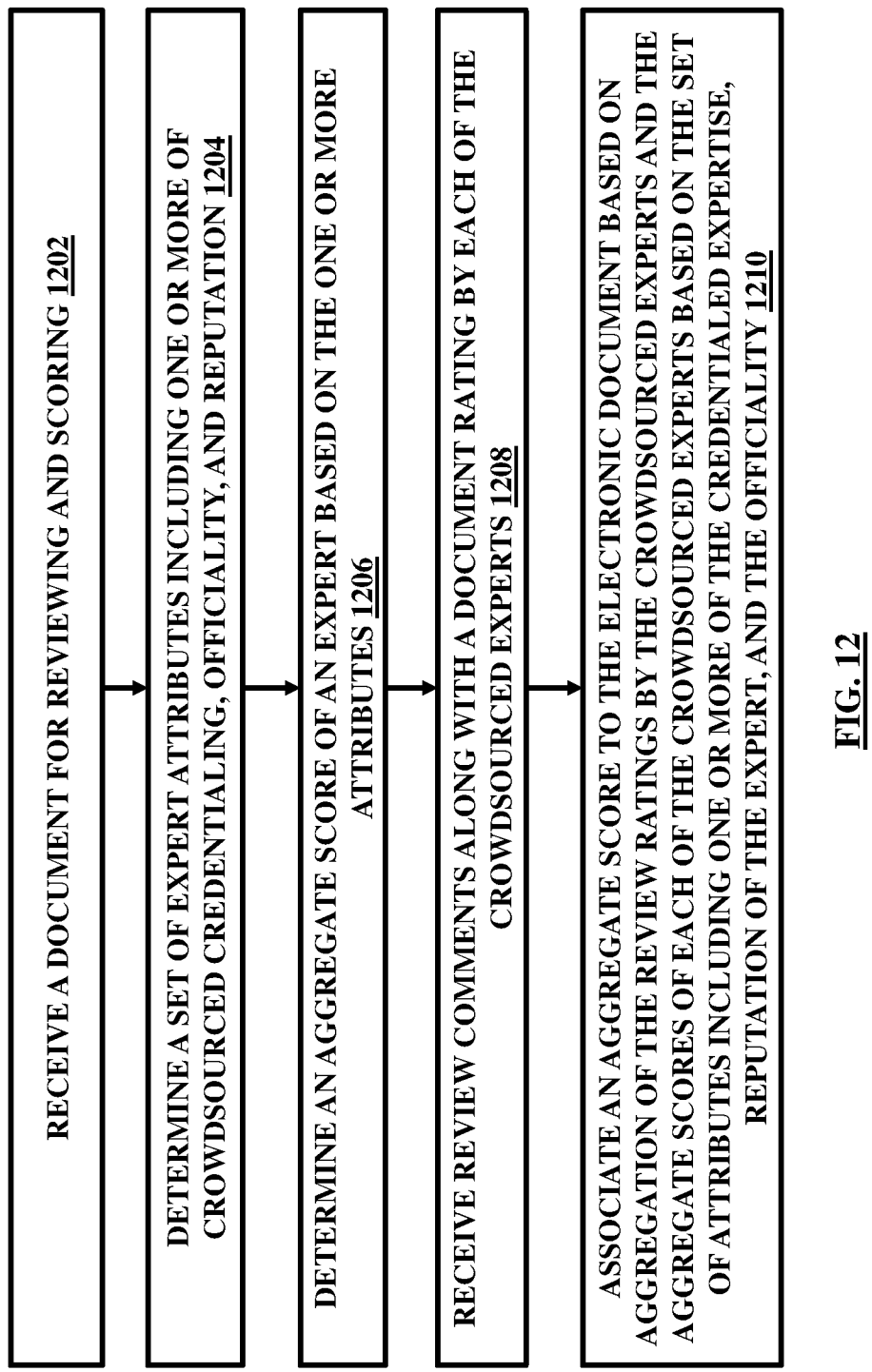
FIG. 12 illustrates a method flow diagram for performing an expertise driven review and scoring of electronic documents in a crowdsourced environment.

FIG. 12, with reference to FIGS. 1 through 11, illustrates a method flow diagram for performing an expertise driven review and scoring of electronic documents in a crowd-sourced environment. The method includes receiving a document from a submitting party for reviewing and scoring by a plurality of crowdsourced experts 202, at step 1202.

The method may further include determining a set of expert attributes including one or more of crowdsourced credentialing, officiality, and reputation, and the like, at step 1204. The reputation is indicative of a trust of a relevant community on the expert, and the officiality is indicative of a position or a designation of the expert in a relevant job and the credentialed expertise is indicative of degree of credentialing of an expert's federated and common profiles by crowdsourced respondents. The methods of determining reputation, officiality, and credentialed expertise have been discussed above. The method may further include determining an aggregate score of an expert such as 202*a* based on the one or more attributes at step 1206. The procedure of determining the aggregate score has been discussed above in conjunction with various figures. The method may further include receiving review comments along with a document rating by each of the crowdsourced experts 202 at step 1208. The method may further include associating an aggregate score to the electronic document based on an aggregation of the review ratings by the crowdsourced experts 202 and the aggregate scores of each of the crowdsourced experts 202 based on the set of attributes including one or more of the credentialed expertise, reputation of the expert, and the officiality, at step 1210. In an example, the method may further include federating a common profile of an expert 202*a* into a plurality of federated profiles based on commonalities or distinctiveness in content of the federated profiles. The federated profiles are treated as distinct profiles for the purpose of credentialing separately by the crowdsourced respondents 204. In an example, the method may also include identifying a degree of relevance and significance of an expert attribute with the electronic document to be reviewed and accordingly assign a weight to each of the attributes of the experts 202 based on the identified degree of significance. The method may include associating a crowdsourcing index with the credentialing. The crowdsourcing index is indicative of a degree of crowdsourcing such that the degree of crowdsourcing non-linearly affects the degree of credentialing or the credentialed expertise as discussed above in conjunction with various figures.

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
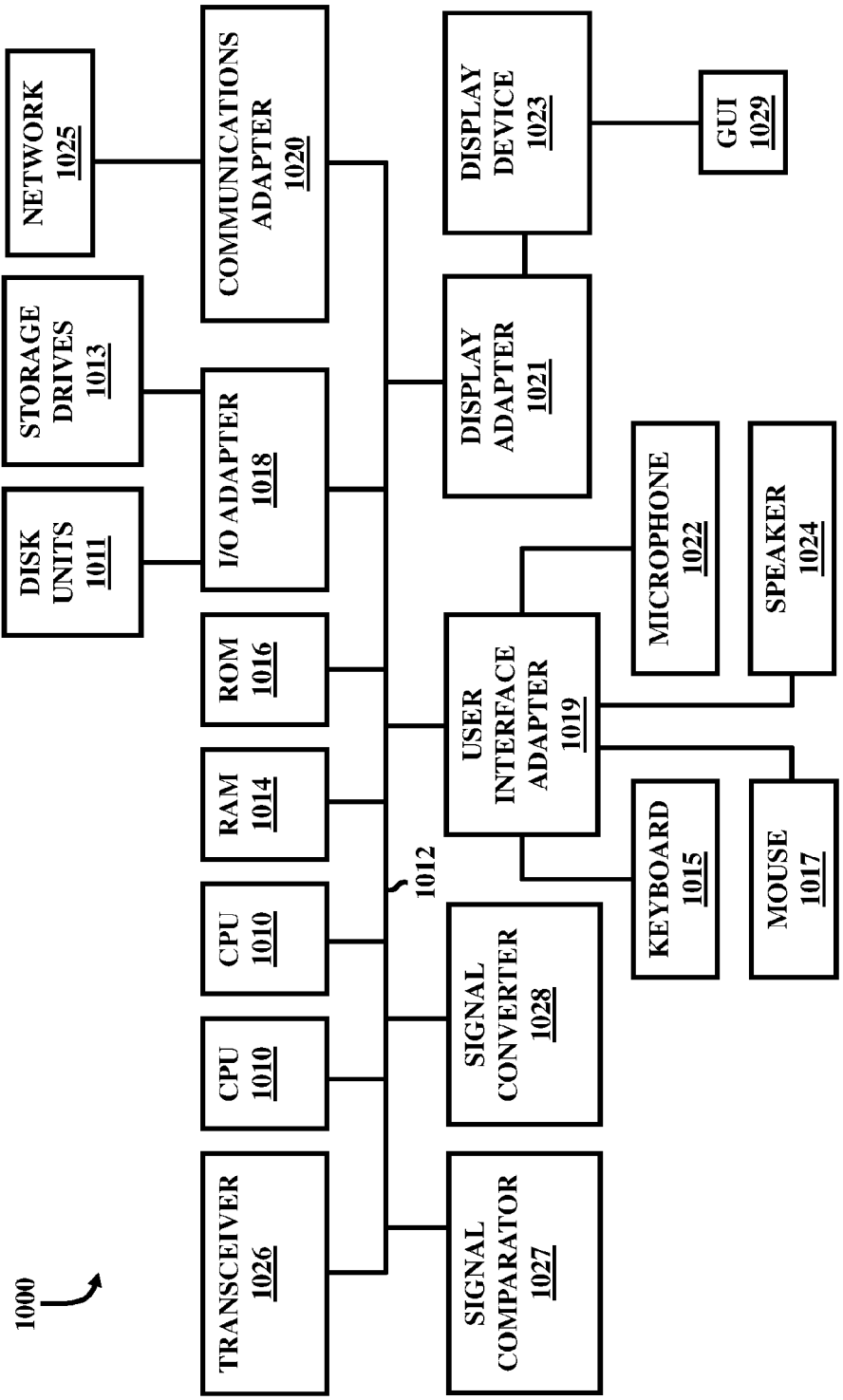
FIG. 13 illustrates generally, but not by the way of limitation, a computer system that may be used in accordance with the embodiments herein.

A representative hardware environment for practicing the embodiments herein is depicted in FIG. 13, with reference to FIGS. 1 through 12. This schematic drawing illustrates a hardware configuration of an information handling/computer system 1000 in accordance with an exemplary embodiment herein. The system 1000 comprises at least one processor or central processing unit (CPU) 1010. The CPUs 1010 are interconnected via system bus 1012 to various devices such as a random access memory (RAM) 1014, read-only memory (ROM) 1016, and an input/output (I/O) adapter 1018. The I/O adapter 1018 can connect to peripheral devices, such as disk units 1011 and storage drives 1013, or other program storage devices that are readable by the system. The system 1000 can read the inventive instructions on the program storage devices and follow these instructions to execute the methodology of the embodiments herein. The system 1000 further includes a user interface adapter 1019 that connects a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023, which provides a GUI 1029 in accordance with the embodiments herein, or which may be embodied as an output device such as a monitor, printer, or transmitter, for example. Further, a transceiver 1026, a signal comparator 1027, and a signal converter 1028 may be connected with the bus 1012 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A blockchain configured distributed architecture-based system in a communication network, said system comprising:
   a memory circuit communicatively connected to said communication network that stores a plurality of digital profiles associated with a plurality of crowdsourced experts, and further stores a plurality of segmented digital profiles associated with each of said digital profiles, wherein said segmented digital profiles and digital profiles are created based on a plurality of sources distributed and electronically linked across said communication network;
   a processor coupled with the memory circuit to execute instructions for evaluating an expert, the instructions comprising:
      a credentialing engine that allows a plurality of crowdsourced respondents to respond to said segmented digital profiles associated with each of said plurality of experts and credential said plurality of experts and determine crowdsourced credentialed expertise, wherein the credentialing of each of said segmented digital profiles associated with an expert of said plurality of experts contribute to credentialing of a digital profile of said expert upon collation of said credentialed segmented digital profiles, and wherein said segmented digital profiles associated with said experts are credentialed from a plurality of respondents using a computerized crowdsourcing index, wherein said computerized crowdsourcing index is indicative of number of respondents credentialing an expert and dynamically increases with an increase in said number of respondents;
   an expert scoring module to:
      determine a set of attributes for said experts, said set of attributes including one or more of said crowdsourced credentialed expertise determined based on said credentialing of said segmented digital profiles of said experts by said respondents, reputation of said experts indicative of a trust of a relevant community on said experts, and officiality indicative of a position or a designation of said experts in a relevant job, wherein each of said attributes are assigned varying computer-calculated weights; and
      determine an aggregate score of an expert based on said one or more attributes in association with the assigned weights;
   an electronic document scoring engine to receive and process comments and document ratings for an electronic document by said crowdsourced experts, wherein said crowdsourced experts have an aggregate score greater than a defined threshold, the document scoring engine comprising:
      a natural language processing-based (NLP-based) analysis engine to process textual information-based reviews and comments generated as part of textual review of said electronic document by said crowdsourced experts;
      a visual scoring engine for processing visual and non-textual feedback and reviews by the crowdsourced experts, wherein the visual scoring engine comprises:
         an eye tracks processor controlled by a special purpose microprocessor to receive eye track inputs from respective eye tracking systems associated with computing devices of said crowdsourced experts and process said eye track inputs to associate a review score based on predefined eye track patterns; and
         a micro expressions processor to receive data indicative of micro facial expressions extracted by respective micro expressions sensors associated with said computing devices of said crowdsourced experts, wherein said micro expressions processor comprises an image processing circuitry and an associated memory to interpret said micro facial expressions and compare them with predefined facial patterns to associate a review score based on said extracted micro facial expressions,
      wherein, the document scoring engine further configured to:
         associate an aggregate score to said electronic document based on aggregation of individual textual and visual review scores obtained by processing of said textual and said visual reviews by said crowdsourced experts who review the document; and
         display on a graphical user interface device, an output indicative of an aggregate score of the document reviewed by said crowdsourced experts along with information about who reviewed and how many times reviewed the document;
   an expert identity validation device to verify identities of the crowdsourced experts during or prior to review, wherein said expert identity validation device comprises:
      a device patterns assessment device to receive and process device information extracted by respective agent devices associated with said computing devices of said crowdsourced experts and verify the extracted device information with predefined device information for the respective crowdsourced experts;

a network patterns assessment device to receive and process network information extracted by said respective agent devices associated with said computing devices of said crowdsourced experts and verify the extracted network information with predefined network information of the respective crowdsourced experts;

a geo-spatial mapping device to perform geo-tagging of the crowdsourced experts and the documents reviewed by said crowdsourced experts and compare the geo-tags with pre-stored geo-spatial information about the experts for processing validation, wherein the geo-tagging is performed based on geo-spatial information received from a global positioning system (GPS)-based device; and a facial expression validation device to receive and process facial expressions received from respective facial expression sensors associated with said computing devices of said crowdsourced experts and verify identity in accordance with respective predefined facial patterns of said crowdsourced experts, wherein the facial expression validation device comprises a digital acquisition unit and multichannel amplifiers for preprocessing and amplification of signals transmitted by said facial expression sensors.

2. The system of claim 1, further comprising an expert scoring module, wherein said expert scoring module further comprises a computerized weight module to identify a degree of relevance and significance of an expert attribute with said electronic document to be reviewed and accordingly assign a weight to each of said attributes of said experts based on said identified degree of significance.

3. The system of claim 2, wherein said attribute of credentialed expertise is weighed as the highest by said weight module followed by said officiality, and said attribute of reputation is weighed as the lowest by said weight module.

4. The system of claim 2, wherein said weight module is adapted to dynamically change weight assignment based on type of said electronic document.

5. The system of claim 1, further comprises a reputation assessment engine adapted to determine a degree of reputation of an expert.

6. The system of claim 1, further comprises an officiality assessment engine to determine a degree of officiality of an expert.

7. The system of claim 1 further comprising a federation engine to fragment a digital profile of an expert into a plurality of segmented digital profiles based on commonalities in content of said segmented digital profiles, wherein said segmented digital profiles are treated as distinct profiles for said purpose of credentialing separately by said crowdsourced respondents.

8. The system of claim 1, wherein said document reviewing and scoring module further comprising an electronic document aggregate score assessment engine, comment analysis module, comment aggregator, semantics and analytics engine, and document classification/tagging module.

9. The system of claim 1, wherein said aggregate score of an expert (AES) for one or more attributes is determined based on an empirical relation, said empirical relation being: AES=EW1+RW2+OW3, wherein 'E' represents credentialed expertise, 'R' represents reputation, and 'O' represents officiality, and W1, W2, W3 represent weightage of said credentialed expertise, reputation, and officiality respectively.

10. The system of claim 9, wherein said credentialing engine evaluates said credentialed expertise (E) for said expert based on an empirical relation, said empirical relation being:

$$E=(P_{F11}+P_{F12}+\ldots+P_{F1N})\times(P_{F21}+P_{F22}+\ldots P_{F2N})X\ldots X(P_{FZ1}+P_{FZ2}+\ldots+P_{FZN}),$$

wherein:

$P_{F11}$ is nonzero and represents a credentialed segmented profile score for a first segmented profile of a first expert by a first respondent, $P_{F12}$ is nonzero and represents a credentialed segmented profile score for said first segmented profile of said first expert by a second respondent, $P_{F1N}$ is nonzero and represents a credentialed segmented profile score for said first segmented profile of said first expert by an Nth respondent, $P_{F21}$ is nonzero and represents a credentialed segmented profile score for a second segmented profile of said first expert by said first respondent, $P_{F22}$ is nonzero and represents a credentialed segmented profile score for said second segmented profile of said first expert by said second respondent, $P_{F2N}$ is nonzero and represents a credentialed segmented profile score for said second segmented profile of said first expert by said Nth respondent, $P_{FZ1}$ is nonzero and represents a credentialed segmented profile score for a Zth segmented profile of said first expert by said first respondent, $P_{FZ2}$ is nonzero and represents a credentialed segmented profile score for said Zth segmented profile of said first expert by said second respondent, $P_{FZN}$ is nonzero and represents a credentialed segmented profile score for said Zth segmented profile of said first expert by said Nth respondent, and wherein said empirical relation above considers profiles scores for entire segmented digital profiles from 1 to Z, wherein said empirical relation above considers all respondents from 1 to N.

11. The system of claim 10, wherein said document reviewing and scoring engine evaluates aggregate crowdsourced document score (ACDS) based on credentialed expertise and other attributes of said crowdsourced experts, based on an empirical relation, said empirical relation being:

$$ACDS=\{(E_1+E_2+E_3+\ldots+E_X)W_1+(R_1+R_2+R_3+\ldots+R_X)W_2+(O_1+O_2+O_3+\ldots+O_X)W_3\}(D_1+D_2+D_3+\ldots+D_X)CI$$

wherein:

$E_1, E_2, E_3, \ldots E_X$ represent respective credentialed expertise of X number of crowdsourced experts, $R_1, R_2, R_3, \ldots R_X$ represent respective reputation of said X number of crowdsourced experts, $O_1, O_2, O_3, \ldots O_X$ represent respective officiality of said X number of crowdsourced experts, $D_1, D_2, D_3 \ldots D_X$ represent respective document scores earned by said X number of crowdsourced experts, and CI represents a non-linear crowdsourcing index.

12. The system of claim 11, wherein said CI is defined non-linearly with integral ranges (R) of experts who credential said document, first five of said ranges and corresponding CI being:

CI=1, when R=0-2 experts,
CI=1.2, when R=3-4 experts,
CI=1.5, when R=5-6 experts CI=1.9, when R=7-8 experts, and
CI=2.5, when R=9-10 experts.

13. The system of claim 11, wherein said CI is calculated based on an empirical relationship that dynamically determines value of said CI with every integral change in number of expert credentialing said electronic document.

14. The system of claim 1, wherein said eye tracks processor is configured to process the eye tracks inputs, wherein said eye tracks inputs includes data indicative of time lapse on specific sections of the document under review, repeat reading, coherence between eye focus and scrolling speed, blinks, expert's gaze location, eye fixations, saccades, gaze rate, gaze direction, gaze percentage, number of fixations, scan path directionality, instances of backtracking, frequency of long duration dwells over areas of interest, saccade length, fixation/saccade time ratio, and visual profile of review-flow.

15. The system of claim 1, wherein said facial expressions processor is configured to process the facial expressions, and wherein said facial expressions includes data indicative of sensation or passion of an expert, mental views and psychosomatic aspects originating from bones, tissues, skin, muscles, deformities, facial contractions and expansions.

16. The system of claim 1, wherein said visual scoring engine further comprising an image processor configured to perform image processing and pre-processing tasks.

\* \* \* \* \*